United States Patent
Takamura et al.

(10) Patent No.: US 11,248,527 B2
(45) Date of Patent: Feb. 15, 2022

(54) RING SEGMENT AND GAS TURBINE

(71) Applicant: Mitsubishi Hitachi Power Systems, Ltd., Kanagawa (JP)

(72) Inventors: Keita Takamura, Kanagawa (JP); Masamitsu Kuwabara, Kanagawa (JP); Yusuke Izumi, Kanagawa (JP)

(73) Assignee: MITSUBISHI POWER, LTD., Kanagawa (JP)

(*) Notice: Subject to any disclaimer, the term of this patent is extended or adjusted under 35 U.S.C. 154(b) by 52 days.

(21) Appl. No.: 16/468,167

(22) PCT Filed: Sep. 13, 2017

(86) PCT No.: PCT/JP2017/033078
§ 371 (c)(1),
(2) Date: Jun. 10, 2019

(87) PCT Pub. No.: WO2018/110009
PCT Pub. Date: Jun. 21, 2018

(65) Prior Publication Data
US 2020/0072465 A1    Mar. 5, 2020

(30) Foreign Application Priority Data
Dec. 14, 2016 (JP) .............................. JP2016-242660

(51) Int. Cl.
*F02C 7/18* (2006.01)
*F01D 11/08* (2006.01)

(52) U.S. Cl.
CPC ............... *F02C 7/18* (2013.01); *F01D 11/08* (2013.01); *F05D 2240/11* (2013.01)

(58) Field of Classification Search
CPC ......... F01D 11/08; F05D 2240/11; F02C 7/18
See application file for complete search history.

(56) References Cited

U.S. PATENT DOCUMENTS 5,486,090 A * 1/1996 Thompson .............. F01D 25/12
                                                    415/173.1
6,899,518 B2 * 5/2005 Lucas ........................ F01D 9/04
                                                    415/116
(Continued)

FOREIGN PATENT DOCUMENTS

CN    102414398    4/2012
CN    102472169    5/2012
(Continued)

OTHER PUBLICATIONS

International Search Report dated Dec. 5, 2017 in International (PCT) Patent Application No. PCT/JP2017/033078, with English Translation.
(Continued)

Primary Examiner — Michael L Sehn
(74) Attorney, Agent, or Firm — Wenderoth, Lind & Ponack, L.L.P.

(57) ABSTRACT

A ring segment includes segment bodies arranged along a circumferential direction; a main cavity; first cooling channels inside the segment body to extend along an axial direction of a rotor and arrayed in the circumferential direction, and whose ends communicate with the main cavity on an upstream side thereof; a second cooling channel inside the segment body on an upstream side in a rotation direction of the rotor to extend along the axial direction, and whose first end communicates with the main cavity on the upstream side thereof; and third cooling channels to extend along the circumferential direction, in a predetermined region forming a part of a lateral end of the segment body on the upstream side and stretching from an end of the segment body on a downstream side in the combustion gas flow direction toward the upstream side, and whose first ends communicate with the second cooling channel.

14 Claims, 14 Drawing Sheets

(56) References Cited

U.S. PATENT DOCUMENTS

| | | | |
|---|---|---|---|
| 8,777,559 B2 | 7/2014 | Koyabu et al. | |
| 9,017,012 B2 * | 4/2015 | Brunelli | F01D 25/12 415/115 |
| 9,540,947 B2 | 1/2017 | Koyabu et al. | |
| 2001/0048878 A1 | 12/2001 | Willett et al. | |
| 2011/0044805 A1 | 2/2011 | Koyabu et al. | |
| 2011/0182724 A1 | 7/2011 | Koyabu et al. | |
| 2013/0011238 A1 | 1/2013 | Liang et al. | |
| 2014/0234077 A1 | 8/2014 | Koyabu et al. | |
| 2014/0290255 A1 * | 10/2014 | Akagi | B21D 53/92 60/752 |
| 2017/0138211 A1 * | 5/2017 | Fukui | F01D 11/08 |

FOREIGN PATENT DOCUMENTS

| | | |
|---|---|---|
| EP | 2 562 358 | 2/2013 |
| JP | 2000-297604 | 10/2000 |
| JP | 2010-31753 | 2/2010 |
| JP | 2011-153540 | 8/2011 |
| JP | 5518235 | 6/2014 |
| KR | 10-2012-0018753 | 3/2012 |
| KR | 10-2012-0120951 | 11/2012 |
| WO | 2011/024242 | 3/2011 |
| WO | 2011/132217 | 10/2011 |
| WO | 2015/146854 | 10/2015 |

OTHER PUBLICATIONS

Written Opinion of the International Searching Authority dated Dec. 5, 2017 in International (PCT) Patent Application No. PCT/JP2017/033078, with English Translation.

Letter of Notice of Examiner's Opinions dated Apr. 16, 2019 in Taiwanese Patent Application No. 106137844, with English Translation.

Office Action dated Jun. 15, 2020 in corresponding Korean Patent Application No. 10-2019-7016828 with English-language translation.

Extended European Search report dated Nov. 6, 2019 in European Patent Application No. 17881464.6.

* cited by examiner

RING SEGMENT AND GAS TURBINE

TECHNICAL FIELD

The present invention relates to a ring segment that is applied, for example, to a gas turbine, and a gas turbine including this ring segment.

BACKGROUND ART

A typical gas turbine is composed of a compressor, a combustor, and a turbine. The compressor compresses air, taken in through an air intake opening, into high-temperature, high-pressure compressed air. The combustor supplies fuel to this compressed air and combusts the mixture to produce high-temperature, high-pressure combustion gas. The turbine is driven by this combustion gas, and in turn drives a power generator coaxially coupled to the turbine.

In such a gas turbine, the turbine has pluralities of vanes and blades arranged inside a casing alternately along a combustion gas flow direction. The vanes are each supported on a shroud mounted on an inner side of the casing, while the blades are supported on a rotor. Thus, the rotor is driven to rotate as the combustion gas generated by the combustor passes through the vanes and blades when flowing through a combustion gas flow passage. This combustion gas flow passage is formed as a space surrounded by outer shrouds, inner shrouds, platforms of the blades, and ring segments. The ring segment has a ring shape along a rotation direction of the rotor, and is supported on the casing through a heat shield ring and a blade ring.

The ring segment is composed of a plurality of segment bodies that are disposed along the circumferential direction, and each segment body is supported on the heat shield ring. An impingement plate has a plurality of small holes, through which cooling air is blown out toward the segment body to perform impingement cooling on the segment body. Moreover, the segment body is provided with a plurality of cooling channels along the combustion gas flow direction, and the cooling air having performed impingement cooling flows through these cooling channels to perform convective cooling on the segment body. Ends of the segment bodies that are adjacent to each other in the circumferential direction are coupled together by a sealing member. A plurality of cooling channels are provided at the adjacent ends of the segment bodies to cool these ends with cooling air.

Examples of such a gas turbine include the one described in Patent Literature 1.

CITATION LIST

Patent Literature

[Patent Literature 1] Japanese Patent No. 5518235

SUMMARY OF INVENTION

Technical Problem

Since the ring segment is provided so as to face the combustion gas flow passage through which combustion gas flows, cooling the ring segment is important for continuing stable operation of the turbine. The conventional ring segment (segment body) is provided with a plurality of cooling channels extending along the direction of a rotational axis of the rotor, and with a plurality of cooling channels extending along the rotation direction of the rotor at both ends on the upstream side and the downstream side in the rotation direction of the rotor. However, cooling air used to cool the ring segment is extracted from compressed air compressed by the compressor. Accordingly, if the ring segment is to be sufficiently cooled, a large amount of air extracted from compressed air compressed by the compressor needs to be used, which reduces the efficiency of the gas turbine and degrades the performance.

The present invention has been contrived to solve the above problem, and an object thereof is to provide a ring segment that is cooled at an appropriate position through effective use of cooling air so as to avoid performance degradation, and to further provide a gas turbine.

Solution to Problem

A ring segment of an aspect of the present invention to achieve the above object is a ring segment of a gas turbine that is formed as a plurality of segment bodies is arranged annularly along a circumferential direction. This ring segment includes: a main cavity that is provided on an outer side of the segment body in a radial direction of the ring segment and receives cooling air from outside; a plurality of first cooling channels which is provided inside the segment body so as to extend along an axial direction of a rotor and be arrayed in the circumferential direction, and of which first ends communicate with the main cavity on an upstream side thereof in a combustion gas flow direction while second ends open toward a downstream side of the segment body in the combustion gas flow direction; a second cooling channel which is disposed inside the segment body on an upstream side thereof in a rotation direction of the rotor, adjacent to the first cooling channel, so as to extend along the axial direction of the rotor, and of which a first end communicates with the main cavity on the upstream side thereof in the combustion gas flow direction; and a plurality of third cooling channels which is provided inside the segment body so as to extend along the circumferential direction of the ring segment, in a predetermined region along the axial direction of the rotor that is a region forming a part of a lateral end of the segment body on the upstream side in the rotation direction of the rotor and stretching from an end of the segment body on a downstream side in the combustion gas flow direction toward the upstream side, and of which first ends communicate with the second cooling channel while second ends open at the lateral end on the upstream side in the rotation direction of the rotor.

Thus, the cooling air in the main cavity flows through the first cooling channels along the axial direction of the rotor and is blown out toward the downstream side in the combustion gas flow direction, thereby performing convective cooling on the segment body. Moreover, the cooling air in the main cavity flows through the second cooling channel along the axial direction of the rotor and is then blown out through the third cooling channels toward the upstream side in the rotation direction of blades, thereby performing convective cooling on a part of the segment body on the upstream side in the rotation direction of the rotor and on the downstream side in the combustion gas flow direction. As a result, a region of the segment body that tends to reach a high temperature is intensively cooled, and thus the ring segment can be cooled at an appropriate position through effective use of cooling air so as to avoid performance degradation.

In the ring segment of the aspect of the present invention, the main cavity is defined as an impingement plate is fixed to a recess on an outer surface side of the segment body.

Thus, the main cavity is formed as the impingement plate is fixed to the recess on the outer surface side of the segment body, so that the segment body can be efficiently cooled by impingement cooling.

In the ring segment of the aspect of the present invention, the segment body is provided with an upstream-side cavity farther on the upstream side in the combustion gas flow direction than the main cavity. The main cavity and the upstream-side cavity communicate with each other through an upstream-side channel. The first cooling channels and the second cooling channel communicate with the upstream-side cavity.

Thus, the cooling air in the main cavity is supplied to the upstream-side cavity through the upstream-side channel and then supplied from the upstream-side cavity to the first cooling channels and the second cooling channel, so that a region of the segment body on the upstream side in the combustion gas flow direction can be subjected to convective cooling.

In the ring segment of the aspect of the present invention, a second end of the second cooling channel is closed.

When the second end of the second cooling channel is thus closed, the entire cooling air supplied to the second cooling channel can be supplied to the third cooling channels to efficiently perform convective cooling on a part of the segment body on the downstream side in the combustion gas flow direction.

In the ring segment of the aspect of the present invention, a second end of the second cooling channel opens toward the downstream side of the segment body in the combustion gas flow direction, and is provided with a constriction.

When the constriction is thus provided at the second end of the second cooling channel, most of the cooling air supplied to the second cooling channel can be supplied to the third cooling channels to efficiently perform convective cooling on the part of the segment body on the downstream side in the combustion gas flow direction.

In the ring segment of the aspect of the present invention, the first cooling channels are arrayed inside the segment body along the circumferential direction of the ring segment, and a density of openings of those of the first cooling channels that are provided on the upstream side in the rotation direction of the rotor is set to be higher than a density of openings of those of the first cooling channels that are provided on the downstream side in the rotation direction of the rotor.

When the density of openings of those of the first cooling channels that are provided on the upstream side in the rotation direction of the rotor is thus set to be higher than the density of openings of those of the first cooling channels that are provided on the downstream side in the rotation direction of the rotor by setting the intervals of the former to be narrower than the intervals of the latter, an area of cooling at the end of the segment body on the upstream side in the rotation direction of the rotor is increased and a region that tends to reach a high temperature can be efficiently cooled.

The ring segment of the aspect of the present invention further includes a plurality of fourth cooling channels which is provided inside the segment body so as to extend along the circumferential direction of the ring segment, and of which first ends communicate with the first cooling channel while second ends open toward the downstream side in the rotation direction of the rotor.

Thus, part of the cooling air in the first cooling channel is blown out through the fourth cooling channels toward the downstream side in the rotation direction of the rotor, so that a part of the segment body on the downstream side in the combustion gas flow direction can be efficiently cooled by convective cooling.

In the ring segment of the aspect of the present invention, the third cooling channels are provided from the end of the segment body on the downstream side in the combustion gas flow direction toward the upstream side, in a region stretching from a position of 50% to 25% of an overall length of the segment body in the combustion gas flow direction to the end on the downstream side in the combustion gas flow direction.

When the third cooling channels are thus provided in an appropriate region of the segment body on the downstream side in the combustion gas flow direction, a region of the segment body on the upstream side in the rotation direction of the rotor and on the downstream side in the combustion gas flow direction can be efficiently cooled.

In the ring segment of the aspect of the present invention, the third cooling channels are disposed farther on the downstream side in the combustion gas flow direction than a region where the main cavity is formed.

Thus, the third cooling channels can solve the insufficiency of cooling in a region at a lateral end that lies outside the region of the main cavity and is not sufficiently cooled.

In the ring segment of the aspect of the present invention, the segment body includes a plurality of support members that extends from ends of a main body on the upstream side and the downstream side in the axial direction toward the outer side in the radial direction and supports the segment body onto a casing, and the third cooling channels are disposed farther on the downstream side in the combustion gas flow direction than an inner wall surface of the support member that is disposed on the downstream side in the axial direction.

Thus, a part that is located near a surface of the support member (hook) on the inner side in the radial direction and may be not sufficiently cooled due to the presence of the support member can be efficiently cooled.

The ring segment of the aspect of the present invention further includes a fifth cooling channel which is disposed at the lateral end on the upstream side in the rotation direction of the rotor, on the upstream side of the third cooling channels in the combustion gas flow direction, and of which a first end communicates with the second cooling channel while a second end opens at the lateral end on the upstream side in the rotation direction of the rotor.

Thus, cooling air discharged through the fifth cooling channels not only performs convective cooling on the upstream-side lateral end, but also dilutes the combustion gas flowing through a clearance between ring segments and thereby lowers the temperature of the combustion gas, so that overheating of a region on the downstream side in the combustion gas flow direction can be prevented.

In the ring segment of the aspect of the present invention, a density of openings of the fifth cooling channel is set to be lower than a density of openings of the third cooling channels.

Thus, it is possible to prevent overheating of the region on the downstream side in the combustion gas flow direction while cooling a part on the upstream side in the rotation direction of the blades by the cooling air flowing through the fifth cooling channels.

A gas turbine of an aspect of the present invention includes: a compressor that compresses air; a combustor that mixes compressed air compressed by the compressor with fuel and combusts the mixture; a turbine that obtains rotary power by combustion gas generated by the combustor; and the above-described ring segment that is disposed on an outer circumferential side of blades in the turbine.

Thus, it is possible to cool the ring segment at an appropriate position through effective use of cooling air by intensively cooling a region of the segment body that tends to reach a high temperature. As a result, the amount of compressed air that is extracted from the compressor and used as the cooling air can be reduced to avoid degradation of the turbine performance.

Advantageous Effects of Invention

According to the ring segment and the gas turbine of the present invention, the third cooling channels are provided in a region of the segment body on the upstream side in the rotation direction of the rotor, at the end on the downstream side in the combustion gas flow direction, which makes it possible to intensively cool a region of the segment body that tends to reach a high temperature, and to thereby cool the ring segment at an appropriate position through effective use of cooling air so as to avoid performance degradation.

DESCRIPTION OF EMBODIMENTS

Figure 1A:
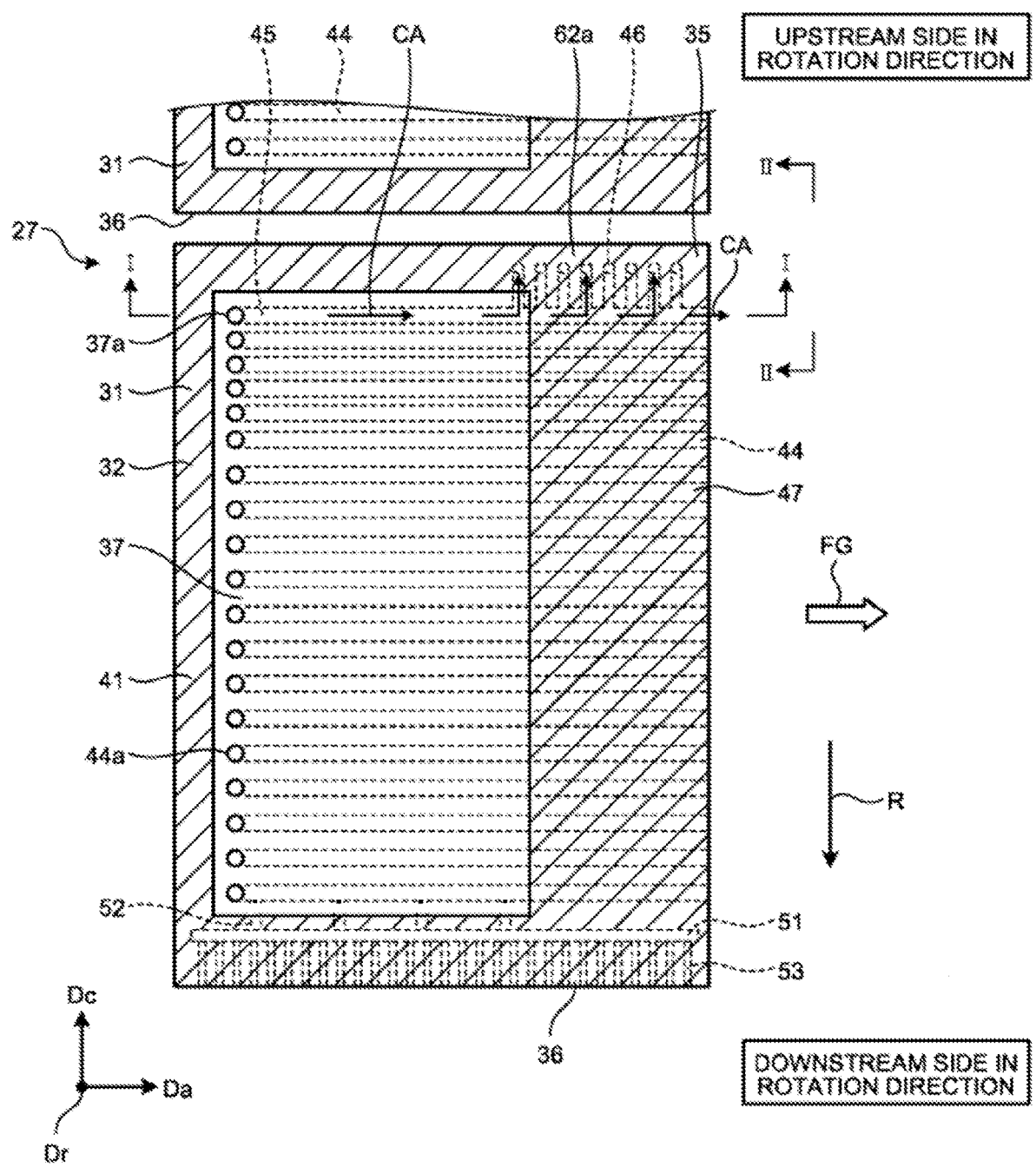
FIG. 1A is a sectional view of a ring segment as seen from an outer side in a radial direction, showing an example of the basic configuration of the present invention.
Figure 1B:
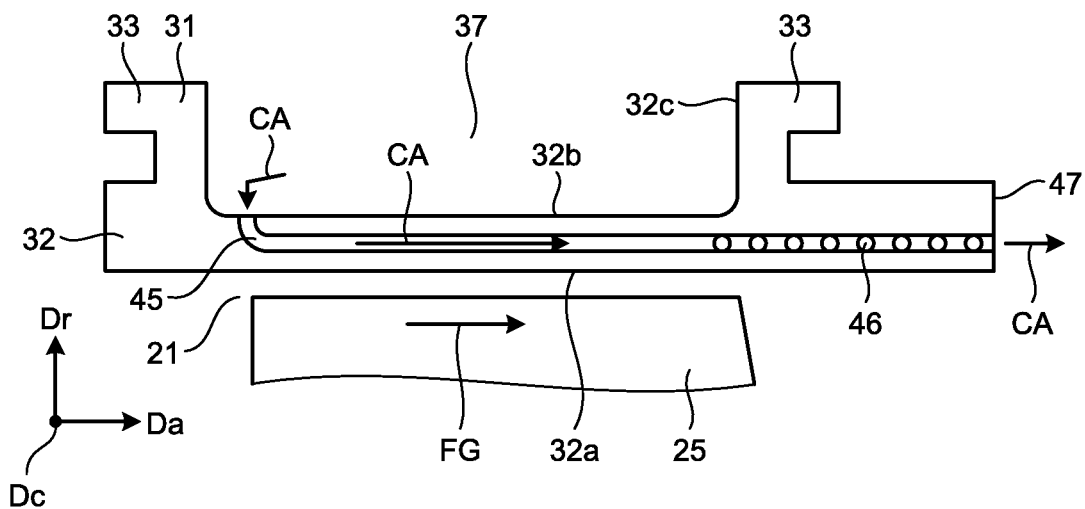
FIG. 1B is a section of the ring segment as seen from a circumferential direction (section I-I in FIG. 1A).
Figure 1C:
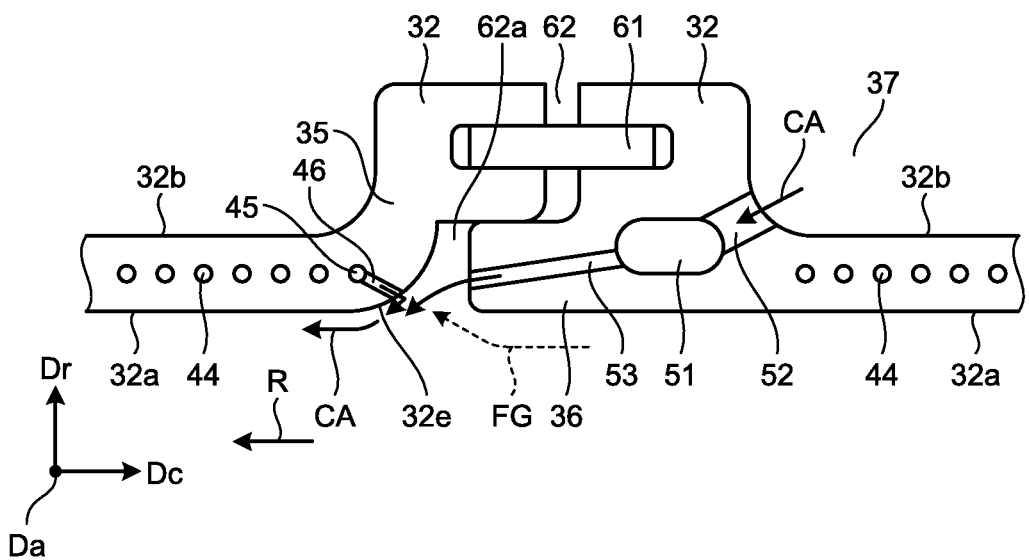
FIG. 1C is a section of the ring segment as seen from a downstream side in an axial direction (section II-II in FIG. 1A).

One example of a feature of the present invention is a cooling structure of a rotationally upstream-side lateral end of a segment body that forms a part of a ring segment. The basic concept and basic configuration of the present invention will be described below using FIG. 1A to FIG. 1C. FIG. 1A shows a section, as seen from above, of a segment body showing an aspect of the basic configuration of the ring segment according to the present invention. FIG. 1B shows a section of the segment body as seen from a circumferential direction. FIG. 1C shows a section, as seen from an axially downstream side, of the segment body on a side on which the segment body is mated with another segment body adjacent thereto in the circumferential direction.

The concept and basic configuration of the feature of the present invention are a basic idea common to embodiments and modified examples to be described later.

A ring segment 27 shown in FIG. 1A is composed of a plurality of segment bodies 31 that is formed annularly in a circumferential direction Dc. Each segment body 31 has, as a main component, a main body 32 with cooling channels formed inside. As shown in FIG. 1A to FIG. 1C, the segment body 31 is disposed such that a surface 32a on an inner side in a radial direction Dr faces a combustion gas flow passage 21 through which combustion gas FG flows. On the inner side of the segment body 31 in the radial direction Dr, a blade 25 that rotates around a rotor 14 is disposed with a certain clearance left between the segment body 31 and the blade 25. To prevent thermal damage due to the high-temperature combustion gas FG, the segment body 31 has axial channels (first cooling channels) 44 that are disposed along the axial direction Da and open into the combustion gas FG at an end 47 on a downstream side in an axial direction Da. The axial channels 44 are arranged so as to be arrayed in the circumferential direction Dc. Cooling air CA supplied from outside to a main cooling space 37 that is formed in a central part of the segment body 31 is supplied to the axial channels 44 through openings 37a that are formed in a surface 32b of the segment body 31 on an outer side in the radial direction Dr and disposed on the upstream side in the axial direction Da. The cooling air CA performs convective cooling on the main body 32 of the segment body 31 in the process of flowing through the axial channels 44 and being discharged into the combustion gas FG at the downstream-side end 47.

Next, a cooling structure on the rotationally upstream side of the segment body 31 will be described. A rotationally upstream-side axial channel 45 (second cooling channel) is formed on the most upstream side in a rotation direction R, adjacent to the axial channel 44 formed inside the segment body 31. A first end of the rotationally upstream-side axial channel 45 may communicate with the opening 37a that is located on the upstream side of the segment body 31 in the axial direction Da and formed in the surface 32b on the outer side in the radial direction Dr, while a second end thereof may open at the end 47 of the segment body 31 on the downstream side in the axial direction Da or may be closed at the terminal end. Moreover, a plurality of rotationally upstream-side first lateral channels 46 (third cooling channels) branches off from the rotationally upstream-side axial channel 45. The rotationally upstream-side first lateral channels 46 forming branches are disposed so as to be oriented toward the upstream side in the rotation direction R, and open into a clearance 62a between the segment body 31 and a lateral end 36 of the adjacent segment body 31 located on the upstream side in the rotation direction R. The rotationally upstream-side first lateral channels 46 are disposed at a lateral end 35 of the segment body 31 on the rotationally upstream side, and are formed in a predetermined region from the end surface 47a of the downstream-side end 47 toward the axially upstream side but need not be formed along the overall length of the segment body 31 up to an end 41 thereof on the upstream side in the axial direction Da. The structure of the ring segment and the structure of the periphery of the ring segment will be described in detail in each embodiment to be described later. The cooling structure including the rotationally upstream-side first lateral channels 46 is one aspect of the feature of the present invention. The technical significance of disposing the rotationally upstream-side first lateral channels 46 in the predetermined region from the end surface 47a of the downstream-side end 47 toward the upstream side in the axial direction Da will be described below.

Even when a cooling structure including cooling channels formed inside the segment body 31 has the axial channels 44, including the rotationally upstream-side axial channel 45, and rotationally downstream-side lateral channels 53, if this cooling structure does not include the rotationally upstream-side first lateral channels 46, a region on the downstream side in the axial direction Da in the lateral end 35 of the segment body 31 on the upstream side in the rotation direction R may be heated to a high temperature by the combustion gas FG and thermally damaged. The reason will be described below.

As shown in FIG. 1C, as the blades 25 rotate, part of the high-temperature combustion gas FG is entrapped in the clearance 62a between the adjacent segment bodies 31. In this case, an inner surface 32e of the lateral end 35 of the segment body 31 disposed near the clearance 62a that is a surface located close to the rotationally upstream-side axial channel 45 disposed on the most upstream side in the rotation direction R, and that is formed as a curved surface extending from the inner surface 32a of the main body 32 toward the upstream side in the rotation direction R and rising toward the outer side in the radial direction Dr, tends to be overheated compared with the inner surface 32a located close to the other axial channels 44. Specifically, the inner surface 32e close to the rotationally upstream-side axial channel 45 is a region of which the length of a side in the circumferential direction Dc and the area that come in contact with the combustion gas FG are larger than those of the inner surface 32a close to the axial channels 44. Moreover, the inner surface 32e also tends to be affected by an increase in the heat-transfer coefficient due to the entrapped combustion gas FG. These factors make the inner surface 32e of the main body 32 a region that tends to be most overheated in the lateral end 35. On the other hand, cooling of the inner surface 32e of the lateral end 35 is limited to convective cooling through the rotationally upstream-side axial channel 45. Therefore, the region of the segment body 31 on the upstream side in the rotation direction of the blades 25 tends to reach a high temperature due to a heat input from the combustion gas FG that is entrapped as the blades 25 rotate, and tends to be not sufficiently cooled compared with other regions.

Moreover, as shown in FIG. 1B, the cooling air CA introduced from the main cooling space 37 into the rotationally upstream-side axial channel 45 is heated up by a heat input from the main body 32 in the process of flowing toward the downstream side in the axial direction Da. Thus, as the cooling air CA flows further toward the downstream side in the axial direction Da, the cooling air CA flowing through the rotationally upstream-side axial channel 45 is further overheated and the cooling capacity of the cooling air CA further decreases. For this reason, the region of the segment body 31 on the downstream side in the axial direction Da tends to reach a higher temperature than other regions.

As described above, because of the combination of a heat input from the high-temperature combustion gas FG entrapped in the clearance 62a between the segment bodies 31 and a decrease in the cooling capacity of the cooling air CA due to heating up, a region of the lateral end 35 of the segment body 31 on the rotationally upstream side that is a region stretching from an intermediate position in the axial direction Da toward the downstream side tends to reach a high temperature and be thinned by oxidation. To prevent thermal damage to the lateral end 35 on the rotationally upstream side due to high temperature, the rotationally upstream-side first lateral channels 46 that branch off from a part of the rotationally upstream-side axial channel 45 between an intermediate position in the rotationally upstream-side axial channel 45 and the downstream-side end 47, and that open to the clearance 62a between the segment body 31 and the adjacent segment body 31 located on the rotationally upstream side, are disposed at the lateral end 35.

Moreover, as the blades 25 rotate, the combustion gas FG flowing from the upstream side toward the downstream side of the segment body 31 in the axial direction Da develops a pressure difference in a combustion gas flow between the end 41 and the end 47 of the segment body 31 respectively on the upstream side and the downstream side in the axial direction Da. The pressure of the combustion gas FG near the upstream-side end 41 is higher and the pressure of the combustion gas FG near the downstream-side end 47 is lower. The pressure of the cooling air CA supplied from outside is set to be higher than the pressure of the combustion gas FG, and the differential pressure between the cooling air pressure and the combustion gas pressure acts as a driving force to cause the cooling air CA to flow through the axial channels 44 and be discharged through the openings at the downstream-side end 47 into the combustion gas FG.

Thus, the pressure of the combustion gas FG at a position at which the cooling air CA is discharged varies with the position of the rotationally upstream-side first lateral channel 46 in the flow direction of the combustion gas FG. Therefore, even when a pressure loss of the cooling air CA occurring as the cooling air CA flows through the rotationally upstream-side axial channel 45 is taken into account, the differential pressure between the cooling air pressure and the combustion gas pressure acting as a driving force is larger at a position in the lateral end 35 on the downstream side in the axial direction Da than at a position therein on the upstream side in the axial direction Da. This means that the differential pressure between the cooling air pressure and the combustion gas pressure is larger, and the cooling performance of the rotationally upstream-side first lateral channel 46 is higher, as the position at which the cooling air CA is discharged through the rotationally upstream-side first lateral channel 46 into the clearance 62a is closer to the downstream-side end 47. Therefore, when the variation of the differential pressure between the cooling air pressure and the combustion gas pressure is taken into account, it is desirable that the region where the rotationally upstream-side first lateral channels 46 are disposed be disposed along a part of the overall length in the axial direction of the lateral end 35 on the upstream side in the rotation direction R, between an intermediate position in the axial direction Da and the downstream-side end 47.

When the rotationally upstream-side first lateral channels 46 are thus disposed, thermal damage to the lateral end 35 of the segment body 31 on the rotationally upstream side due to a heat input from the combustion gas FG can be prevented. Moreover, in the region on the upstream side of the segment body 31 in the axial direction Da, the lateral end 35 is subjected to convective cooling by the cooling air CA that has been supplied from the main cooling space 37 and has not been heated up. Furthermore, in the region from an intermediate position in the axial direction to the downstream-side end 47, a part of the lateral end 35 near the inner surface 32e is subjected to direct cooling (purge cooling) as the cooling air CA having a sufficient differential pressure is discharged through the rotationally upstream-side first lateral channels 46 opening to the clearance 62a. Thus, compared with a cooling structure in which the rotationally upstream-side first lateral channels 46 are not provided and the cooling air CA is discarded into the combustion gas FG from the downstream-side end 47 through the rotationally upstream-side axial channel 45, the cooling structure representing an aspect of the feature of the present invention includes a cooling structure that combines convective cooling and direct cooling (purge cooling) to cool a predetermined region, which allows reuse of the cooling air CA and thereby effective use of the cooling air CA. Performing direct cooling (purge cooling) on an outer surface means forming an opening of a cooling channel in a surface to be cooled and cooling a part of the outer surface near the opening in the process of discharging the cooling air CA into the combustion gas FG (purging the combustion gas FG). Compared with when a surface to be cooled is subjected to convective cooling through an ordinary cooling channel, when the cooling air CA is discharged through an opening, the inner wall of the opening through which the cooling air CA is discharged can be brought closer to the surface to be cooled, so that the surface to be cooled is further cooled and the cooling performance is improved.

In the following, preferred embodiments of the ring segment and the gas turbine according to the present invention will be described in detail with reference to the accompanying FIG. 2 to FIG. 11. The present invention is not limited by these embodiments, and when there is a plurality of embodiments, the invention also includes configurations obtained by combining these embodiments.

First Embodiment

Figure 7:
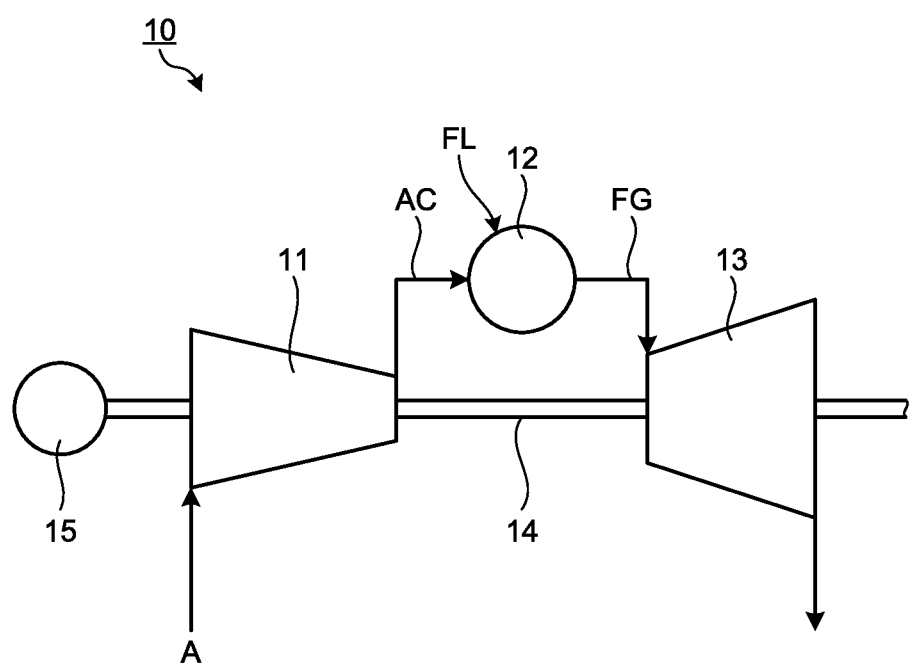
FIG. 7 is a schematic diagram showing the overall configuration of the gas turbine.
Figure 8:
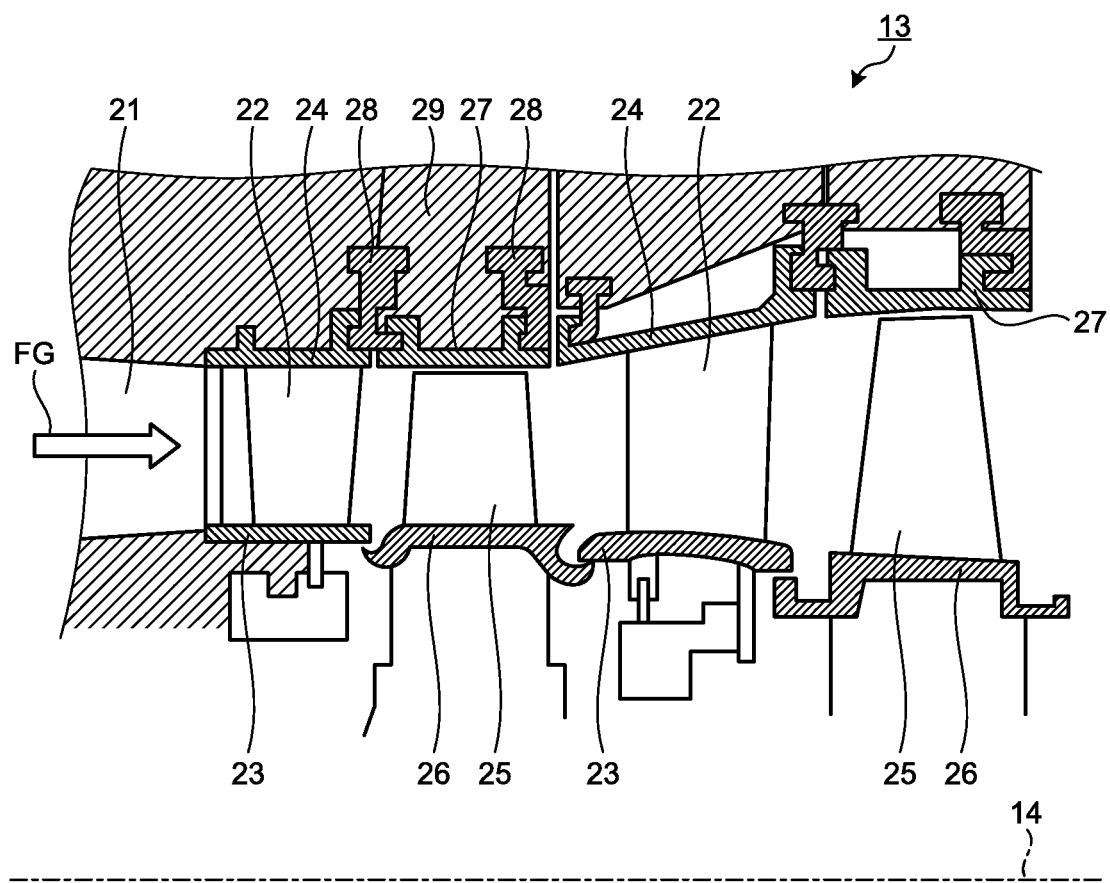
FIG. 8 is a sectional view showing a combustion gas flow passage of a turbine.

FIG. 7 is a schematic view showing the overall configuration of a gas turbine, and FIG. 8 is a sectional view showing a combustion gas flow passage of a turbine.

In a first embodiment, as shown in FIG. 7, a gas turbine 10 is composed of a compressor 11, a combustor 12, and a turbine 13 that are disposed coaxially on a rotor 14, with a power generator 15 coupled to one end of the rotor 14. In the following description, a direction in which an axis of the rotor 14 extends will be referred to as an axial direction Da, a circumferential direction around the axis of the rotor 14 will be referred to as a circumferential direction Dc, and a direction perpendicular to the axis of the rotor 14 will be referred to as a radial direction Dr.

In the compressor 11, air A taken in through an air intake opening passes through pluralities of vanes and blades and is thereby compressed to generate high-temperature, high-pressure compressed air AC. In the combustor 12, predetermined fuel FL is supplied to the compressed air AC and the mixture is combusted to generate high-temperature, high-pressure combustion gas FG. In the turbine 13, the high-temperature, high-pressure combustion gas FG generated by the combustor 12 passes through pluralities of vanes and blades to drive the rotor 14 to rotate, which in turn drives the power generator 15 coupled to the rotor 14.

As shown in FIG. 8, a combustion gas flow passage 21 of the turbine 13 through which the combustion gas FG passes is formed as a space surrounded by inner shrouds 23 and outer shrouds 24 on which vanes 22 are supported, platforms 26 of blades 25, and ring segments 27 disposed on a tip side of the blades 25. The outer shroud 24 and the ring segment 27 are supported on a casing (turbine casing) 29 through a heat shield ring 28.

Figure 2:
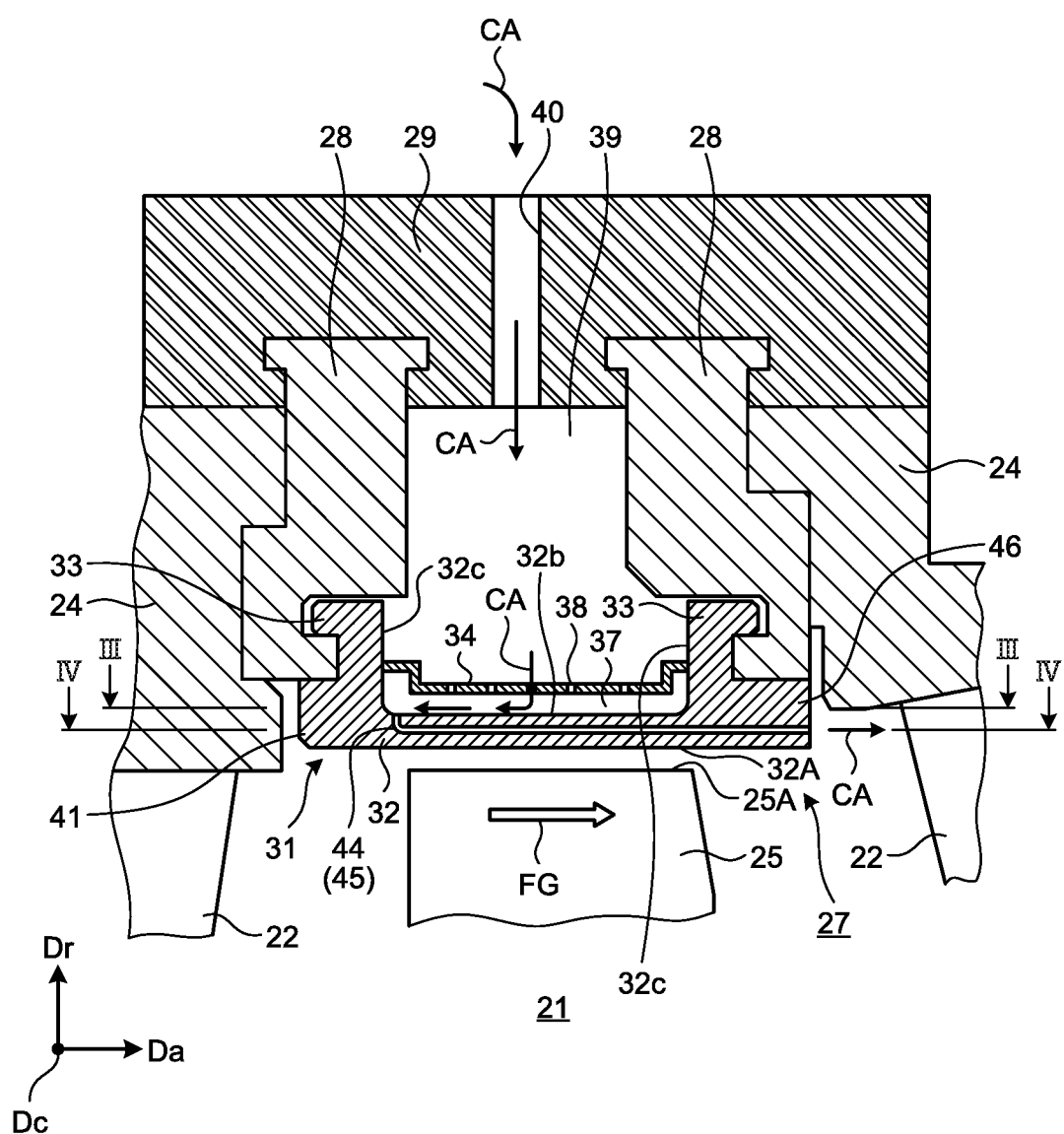
FIG. 2 is a sectional view showing how a ring segment, a heat shield ring, and a casing are coupled together in a gas turbine of a first embodiment.
Figure 3:
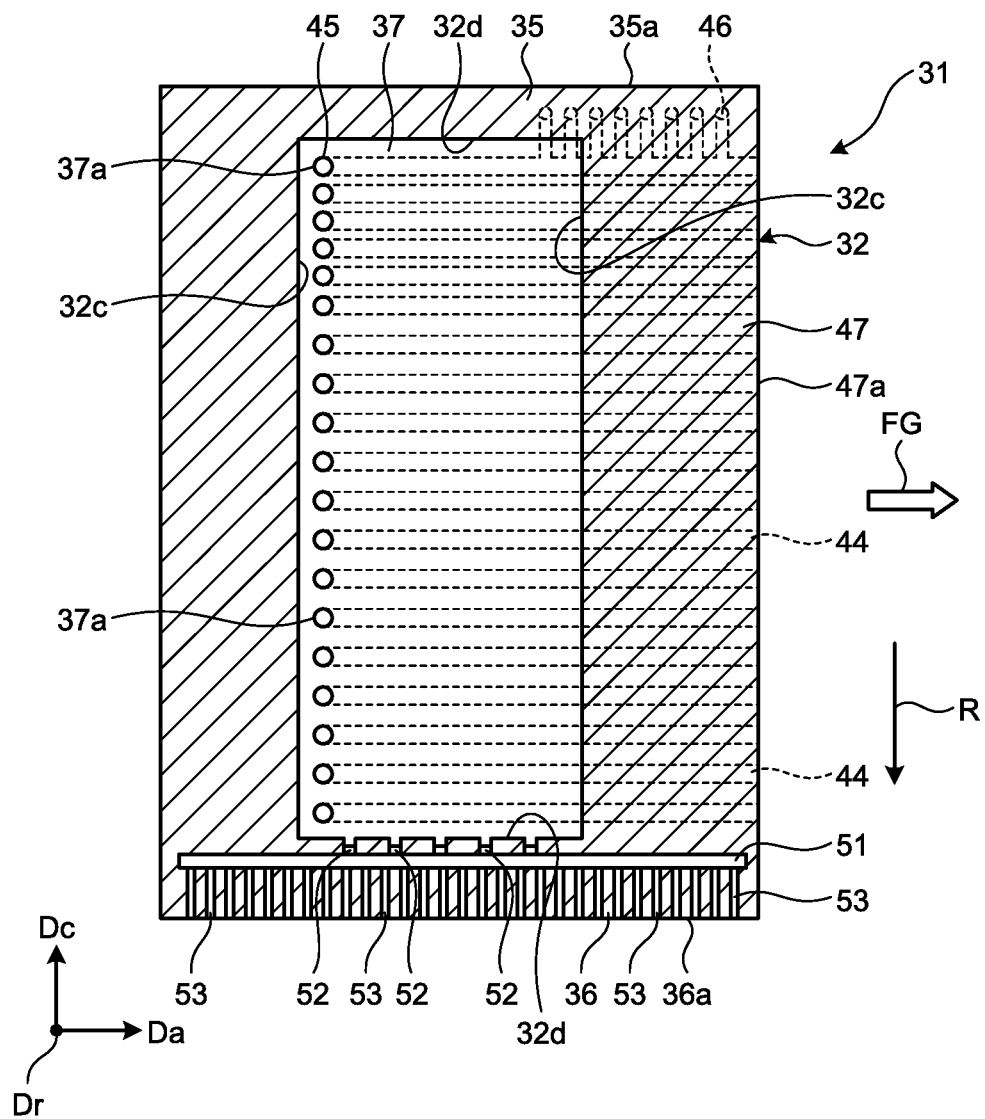
FIG. 3 is a sectional view of the ring segment as seen from the outer side in the radial direction (section in FIG. 2).
Figure 4:
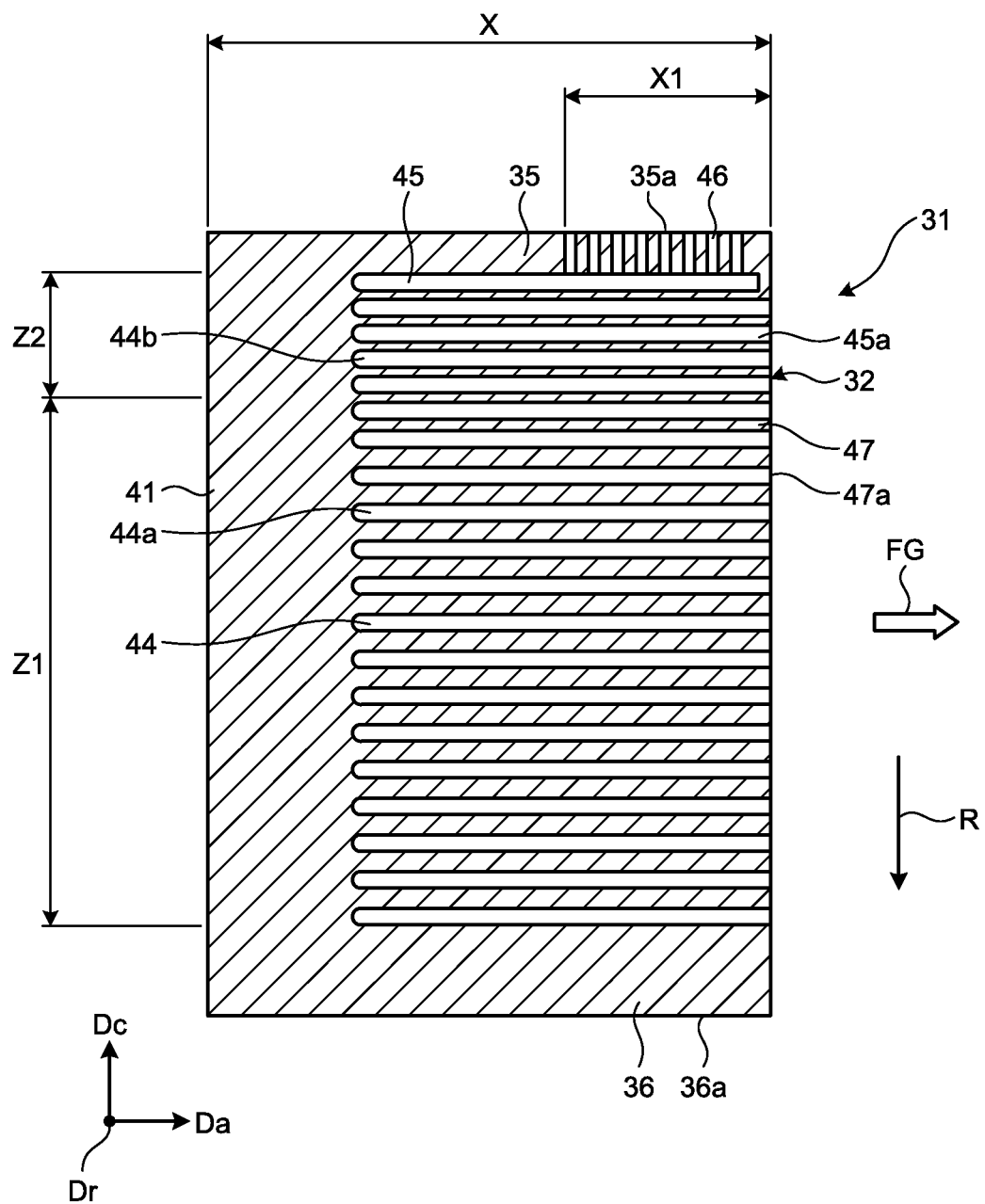
FIG. 4 is a view of a section of the ring segment near a surface on an inner side in the radial direction (section IV-IV in FIG. 2).
Figure 5:
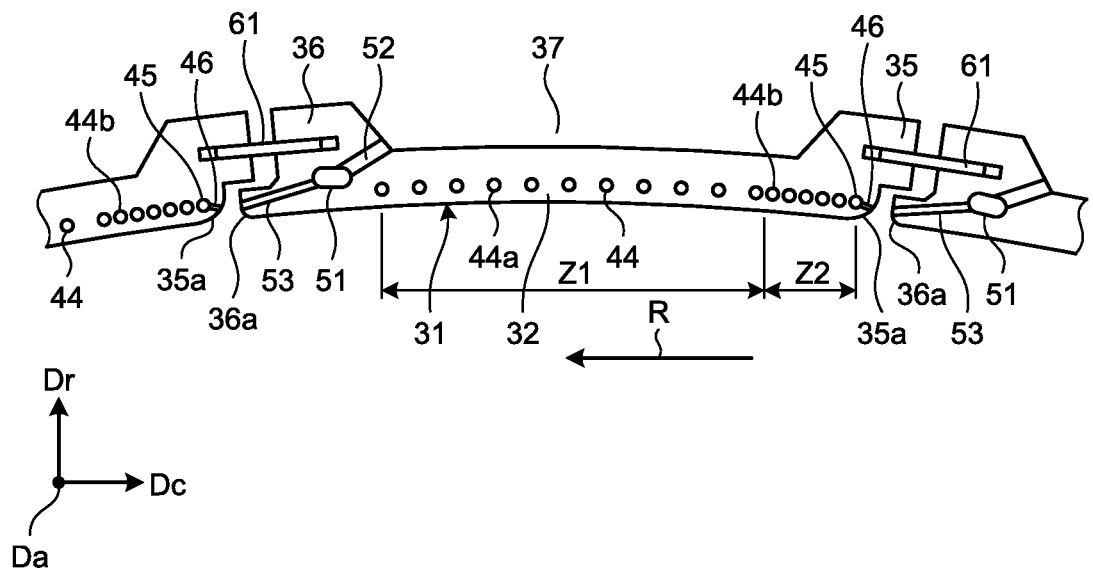
FIG. 5 is a sectional view along the circumferential direction, showing a plurality of ring segments as assembled.
Figure 6:
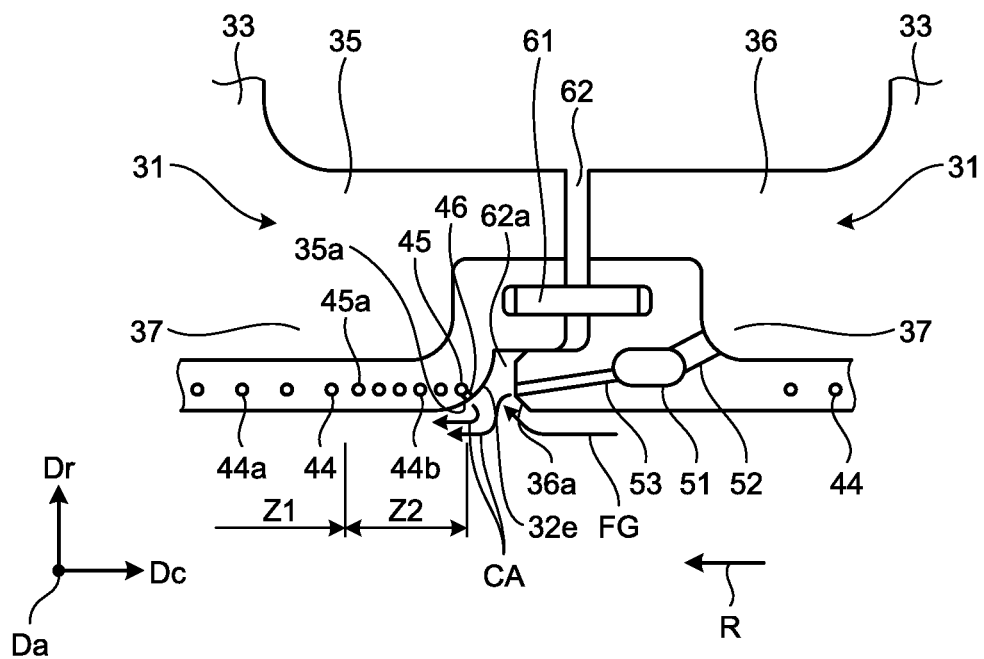
FIG. 6 is a sectional view showing coupled portions of adjacent ring segments.

Here, the ring segment 27 of the first embodiment will be described in detail. FIG. 2 is a sectional view showing how the ring segment, the heat shield ring, and the casing are coupled together in the gas turbine of the first embodiment. FIG. 3 is a sectional view of the ring segment as seen from the outer side in the radial direction (section III-III in FIG. 2). FIG. 4 is a sectional view of a part of the ring segment near a surface on the inner side in the radial direction (section IV-IV in FIG. 2). FIG. 5 is a sectional view along the circumferential direction, showing a plurality of ring segments as assembled. FIG. 6 is a sectional view showing coupled portions of adjacent ring segments.

In the first embodiment, as shown in FIG. 2 to FIG. 4, the ring segment 27 is a constituent member of a turbine unit supported on the casing 29, and is composed of a plurality of segment bodies 31 arranged annularly along the circumferential direction Dc (a rotation direction R of the rotor 14), and the vanes 22 and the blades 25 are arranged in the combustion gas flow passage 21 on the inner side of the ring segment 27 in the radial direction Dr.

The segment body 31 has a main body 32 and hooks (support members) 33 as main components. The segment body 31 is supported by the heat shield ring 28 and disposed such that a certain clearance is secured between a surface 32a of the main body 32 on the inner side in the radial direction Dr and a tip 25a of the blade 25. The segment body 31 is mounted on the heat shield ring 28 through the hooks 33 provided respectively on the upstream side and the downstream side in the flow direction of the combustion gas FG (the axial direction Da of the rotor 14), and is supported on the casing 29 through the heat shield ring 28. The segment body 31 is formed by the main body 32 that forms a bottom surface and the hooks 33 that form inner wall surfaces 32c on the upstream side and the downstream side in the axial direction Da. On the side of a surface 32b of the segment body 31 on the outer side in the radial direction Dr, a main cooling space (main cavity) 37 is provided that is surrounded by the inner wall surfaces 32c on the upstream side and the downstream side in the axial direction Da and by lateral ends 35, 36 that are provided respectively on the upstream side and the downstream side in the rotation direction R of the rotor 14 and form inner wall surfaces 32d on the upstream side and the downstream side in the rotation direction R of the rotor 14. The main cooling space 37 is formed as a recess in the segment body 31, and a flat region defining a bottom surface of the main cooling space 37 forming a recess is a region facing the side of the outer surface 32b of the main body 32 of the segment body 31 on the outer side in the radial direction Dr.

Moreover, the main cooling space 37 may be partitioned by an impingement plate 34 on the outer side of the ring segment 27 in the radial direction Dr of the rotor 14. The impingement plate 34 is provided with a plurality of small holes 38 through which cooling air CA passes. A reception space 39 is disposed between the impingement plate 34 and the casing 29. The reception space 39 communicates with a supply hole 40 that is provided in the casing 29 and extends through the casing 29 in the radial direction Dr of the rotor 14. The cooling air CA supplied through the supply hole 40 into the reception space 39 is blown out through the small holes 38 into the main cooling space 37 while the pressure of the entire cooling air CA is equalized to a substantially equal pressure, and thereby performs impingement cooling on the outer surface 32b of the main body 32 of the segment body 31.

The segment body 31 is provided with a plurality of axial channels (first cooling channels) 44 that extends along the flow direction of the combustion gas FG and is arrayed in the circumferential direction Dc of the ring segment 27. Moreover, the segment body 31 is provided with the rotationally upstream-side axial channel (second cooling channel) 45 on the most upstream side in the rotation direction R of the rotor 14, adjacent to the axial channel 44, so as to extend along the flow direction of the combustion gas FG and be arrayed in the circumferential direction Dc of the ring segment 27. The axial channels 44 and the rotationally upstream-side axial channel 45 are provided at positions closer to the inner surface 32a of the segment body 31 on the inner side in the radial direction Dr than the main cooling space 37 is. Ends of the axial channels 44 and the rotationally upstream-side axial channel 45 on the upstream side in the flow direction of the combustion gas FG communicate with openings 37a on the upstream side of the main cooling space 37 in the flow direction of the combustion gas FG (axial direction Da). Thus, the upstream ends of the axial channels 44 and the rotationally upstream-side axial channel 45 open to the main cooling space 37 on the upstream side of the main cooling space 37 in the flow direction of the combustion gas FG, in the bottom surface near the inner wall surface 32c. Ends of the axial channels 44 and the rotationally upstream-side axial channel 45 on the downstream side in the flow direction of the combustion gas FG open in an end surface 47a of a downstream-side end 47.

The axial channels 44 are composed of channels that are different from each other in density of openings in the circumferential direction Dc. Specifically, the axial channels 44 are composed of axial channels 44a that are provided in a first region Z1 on the downstream side of the segment body 31 in the rotation direction R of the rotor 14, and axial channels 44b that are provided in an adjacent second region Z2 located on the upstream side of the axial channels 44a in the rotation direction of the rotor 14. The second region Z2 is a region that is located adjacent to and on the rotationally downstream side of the rotationally upstream-side axial channel 45 and defined between the axial channels 44a in the first region Z1 and the rotationally upstream-side axial channel 45. The axial channels 44 are disposed such that the density of openings in the circumferential direction Dc of the axial channels 44a in the first region Z1 is lower (sparser) and that the density of openings in the circumferential direction Dc of the axial channels 44b in the second region Z2 is higher (denser). The density of openings is expressed by a ratio "a wetted length of a channel cross-section/a pitch of channels" of channels arrayed in the circumferential direction Dc. If the opening diameter of channels are equal, the density of openings is lower (sparser) when the pitch is larger and the density of openings is higher (denser) when the pitch is smaller. It is desirable that the second region Z2 on the upstream side in the rotation direction R where the axial channels 44b are provided be set to 20% to 30% of the overall circumferential length of the segment body 31 in the circumferential direction.

The ends of the axial channels 44 on the upstream side in the flow direction of the combustion gas FG communicate with the main cooling space 37 on the upstream side thereof in the flow direction of the combustion gas FG, while ends thereof on the downstream side in the flow direction of the combustion gas FG open in the end surface 47a of the downstream-side end 47. The end of the rotationally upstream-side axial channel 45 on the upstream side in the flow direction of the combustion gas FG communicates with the main cooling space 37 on the upstream side thereof in the flow direction of the combustion gas FG, while the end thereof on the downstream side in the flow direction of the combustion gas FG is closed in the end surface 47a of the downstream-side end 47.

The axial channels 44 are formed by a plurality of multi-hole cooling channels, and are composed of the axial channels 44a in the first region Z1 that are disposed sparsely and the axial channels 44b in the second region Z2 that are disposed more densely than the axial channels 44a in the first region Z1.

As shown in FIG. 4 and FIG. 5, a plurality of rotationally upstream-side first lateral channels (third cooling channels) 46 that extends along the circumferential direction Dc of the ring segment 27 and is arrayed in the flow direction of the combustion gas FG is provided at the lateral end 35 of the segment body 31 on the upstream side in the rotation direction R of the rotor 14. Ends of the rotationally upstream-side first lateral channels 46 on the downstream side in the rotation direction R of the rotor 14 communicate with the rotationally upstream-side axial channel 45, while ends thereof on the upstream side in the rotation direction R of the rotor 14 open in an end surface 35a of the lateral end 35. The rotationally upstream-side first lateral channels 46 are provided in a predetermined region X1 stretching from the end surface 47a of the end 47 of the segment 31 on the downstream side in the flow direction of the combustion gas FG toward the upstream side in the axial direction Da. The region X1 is a region along a part of the overall length of the lateral end 35 in the axial direction Da, and stretches, from an intermediate position of 50% to 25% of the overall length of the segment body 31 in the flow direction of the combustion gas FG as seen from the downstream side of the segment body 31 in the flow direction of the combustion gas FG, to the end surface 47a of the end 47 on the downstream side in the flow direction of the combustion gas FG. In other words, the rotationally upstream-side first lateral channels 46 are provided in the region X1 corresponding to 25% to 50% of the entire region X of the segment body 31 along the axial length in the axial direction Da of the rotor 14, with reference to the end 47 of the segment body 31 on the downstream side in the flow direction of the combustion gas FG.

Although the rotationally upstream-side axial channel 45 has been described as being closed in the end surface 47a at the downstream-side end 47, depending on the degree of overheating of the lateral end 35 due to the combustion gas FG or on the cooling capacity of the cooling air CA flowing through the rotationally upstream-side axial channel 45, the downstream-side end surface 47a may be opened instead of closed, and a constriction (orifice) at which the opening area is reduced may be provided to adjust the cooling capacity of the rotationally upstream-side first lateral channels 46.

As shown in FIG. 3 and FIG. 5, a downstream-side cooling space (downstream-side cavity) 51 extending along the axial direction Da of the ring segment 27 (the axial direction of the rotor 14) is provided at the lateral end 36 of the segment body 31 on the downstream side in the rotation direction R of the rotor 14. The main cooling space 37 and the downstream-side cooling space 51 communicate with each other through a plurality of downstream-side connection channels 52 that is provided along the circumferential direction Dc of the ring segment 27. Moreover, a plurality of rotationally downstream-side lateral channels 53 that extends along the circumferential direction Dc of the ring segment 27 and is arrayed in the flow direction of the combustion gas FG is provided at the lateral end 36 of the segment body 31 on the downstream side in the rotation direction R of the rotor 14. Ends of the rotationally downstream-side lateral channels 53 on the upstream side in the rotation direction R of the rotor 14 communicate with the downstream-side cooling space 51, while ends thereof on the downstream side in the rotation direction R of the rotor 14 open in an end surface 36a of the lateral end 36 that faces a clearance 62a between the segment body 31 and the adjacent segment body 31. The rotationally downstream-side lateral channels 53 are provided along the entire axial length of the segment body 31 in the axial direction Da of the rotor 14.

The above-described channels each have a circular cross-sectional shape. However, the channels may have an elliptical or rectangular shape, or may have a slit-like elongated hole shape, instead of a circular shape.

As shown in FIG. 5, the segment bodies 31 composing the ring segment 27 are disposed so as to face one another in the circumferential direction Dc of the rotor 14, and a sealing member 61 is disposed between the adjacent lateral ends 35, 36 so as to keep the combustion gas FG from leaking toward the casing 29 through a clearance 62 between the adjacent lateral ends 35, 36. In this case, the segment bodies 31 adjacent to each other in the circumferential direction Dc of the rotor 14 are disposed such that a lower end portion of the lateral end 36 overlaps the lateral end 35 from the side of the surface on the inner side in the radial direction Dr (the side closer to the center of the rotor 14).

At the lateral end 36 of the segment body 31 on the downstream side in the rotation direction R of the rotor 14, the cooling air CA having performed impingement cooling is supplied from the main cooling space 37 to the downstream-side cooling space 51 through the downstream-side connection channels 52. Moreover, the cooling air CA is blown out from the downstream-side cooling space 51 through the rotationally downstream-side lateral channels 53 into the combustion gas FG in the clearance 62a that is a part of the clearance 62 between the lateral ends 35, 36 and located on the side facing the combustion gas flow passage 21. The rotationally downstream-side lateral channels 53 are inclined toward the inner side in the radial direction Dr such that the blown-out cooling air CA hits the end surface 35a of the lateral end 35 of the adjacent segment body 31. The cooling air CA having been blown against the end surface 35a of the lateral end 35 of the segment body 31 in the radial direction Dr flows along the inner surface of the segment body 31 (the inner surfaces 32a, 32e of the main body 32), and thereby performs film cooling on the surfaces 32a, 32e of the segment body 31 on the inner side in the radial direction Dr. Further, the lateral end 36 is cooled as the cooling air CA flows through the rotationally downstream-side lateral channels 53.

On the other hand, at the lateral end 35 of the segment body 31 on the upstream side in the rotation direction R of the rotor 14, the cooling air CA having performed impingement cooling flows from the main cooling space 37 through the axial channels 44 and is blown out from the downstream-side end 47 into the combustion gas FG. Meanwhile, the cooling air CA in the rotationally upstream-side axial channel 45 is blown out through the rotationally upstream-side first lateral channels 46 into the combustion gas FG on the downstream side in the flow direction of the combustion gas FG in the clearance 62 between the lateral end 35 and the lateral end 36. The rotationally upstream-side first lateral channels 46 are inclined toward the side closer to the center of the rotor 14 such that the blown-out cooling air CA is blown out toward the lateral end 36 of the adjacent segment body 31. The cooling air CA having been blown out from the lateral end 35 of the segment body 31 cools the lateral end 35 itself, and then flows along the inner surface of the segment body 31 (the inner surfaces 32a, 32e of the main body 32) and thereby performs film cooling thereon.

Here, a method of cooling the ring segment 27 and a method of supplying the cooling air CA in the first embodiment will be described.

As shown in FIG. 2, FIG. 4, and FIG. 5, the cooling air CA from the casing 29 is supplied through the supply hole 40 to each segment body 31 of the ring segment 27. The cooling air CA is blown out to the main cooling space 37 through the small holes 38 formed in the impingement plate 34 disposed inside the segment body 31, and thereby performs impingement cooling on the outer surface 32b of the main body 32 of the segment body 31. After performing impingement cooling, the cooling air CA flows through the axial channels 44 and is discharged into the combustion gas FG from the end surface 47a of the downstream-side end 47. In the process of flowing through the axial channels 44, the cooling air CA performs convective cooling on the main body 32. The axial channels 44b disposed in the second region Z2 are provided so as to have a higher density of openings in the circumferential direction Dc than the axial channels 44a disposed in the first region Z1. Accordingly, the cooling capacity of the segment body 31 is higher on the upstream side in the rotation direction R of the rotor 14 than on the downstream side in the rotation direction R.

As shown in FIG. 6, the cooling air CA having been supplied from the main cooling space 37 to the downstream-side cooling space 51 through the downstream-side connection channels 52 is supplied to the rotationally downstream-side lateral channels 53 and discharged into the combustion gas FG from the end surface 36a of the lateral end 36. In this case, the cooling air CA is discharged to the clearance 62a between the segment body 31 and the adjacent segment body 31, and thereby performs convective cooling on the downstream-side lateral end 36 as well as cools an atmospheric gas by purging the combustion gas FG from clearance 62a. Then, the cooling air CA is discharged through the rotationally downstream-side lateral channels 53 that are provided so as to be inclined downward (toward the inner side) in the radial direction Dr. Thus, the cooling air CA is blown against the end surface 35a of the upstream-side lateral end 35 of the adjacent segment body 31 and flows along the inner surfaces 32a, 32e, and thereby performs film cooling on the end surface 35a and the inner surfaces 32a, 32e.

On the other hand, the cooling air CA having been supplied from the main cooling space 37 to the rotationally upstream-side axial channel 45 is supplied from the rotationally upstream-side axial channel 45 to the rotationally upstream-side first lateral channels 46 and discharged from the end surface 35a of the lateral end 35 into the combustion gas FG. In this case, the cooling air CA is discharged to the clearance 62a between the segment bodies 31 and thereby performs convective cooling on the upstream-side lateral end 35 on the downstream side in the flow direction of the combustion gas FG. The cooling air CA is discharged through the rotationally upstream-side first lateral channels 46 that are provided so as to be inclined in the radial direction Dr (toward the inner side). The cooling air CA turns around along the end surface 35a of the lateral end 35 and flows along the inner surfaces 32a, 32e toward the downstream side in the rotation direction R of the rotor 14, and thereby performs film cooling on the end surface 35a and the inner surfaces 32a, 32e.

Thus, the lateral end 36 of the segment body 31 on the downstream side in the rotation direction R of the rotor 14 is subjected to convective cooling by the cooling air CA from the rotationally downstream-side lateral channels 53. On the other hand, the lateral end 35 on the upstream side in the rotation direction R of the rotor 14 is subjected to convective cooling by the cooling air CA from the rotationally upstream-side first lateral channels 46. In this case, the entire region along the flow direction of the combustion gas FG of the lateral end 36 on the downstream side in the rotation direction R of the rotor 14 is cooled by the cooling air CA, while only a predetermined region on the downstream side in the flow direction of the combustion gas FG of the lateral end 35 on the upstream side in the rotation direction R of the rotor 14 is cooled by the cooling air CA.

The lateral end 36 and the lateral end 35 of the segment body 31 respectively on the downstream side and the upstream side in the rotation direction R of the rotor 14 tend to reach high temperatures. In particular, at the upstream-side lateral end 35, the temperature of the cooling air flowing through the axial channels 44 rises gradually (the cooling air is gradually heated up), and the end surface 35a tends to be affected by heat from the combustion gas FG flowing through the combustion gas flow passage 21. However, a region of the upstream-side lateral end 35 on the upstream side in the flow direction of the combustion gas FG is subjected to convective cooling by the cooling air CA flowing through the rotationally upstream-side axial channel 45, and the lateral end 35 is directly cooled through the rotationally upstream-side first lateral channels 46. Thus, as the cooling capacity of the lateral end 35, the combination of the convective cooling through the rotationally upstream-side axial channel 45 and the direct cooling (purge cooling) through the rotationally upstream-side first lateral channels 46 can provide sufficient cooling.

The opposite lateral ends 35, 36 of the adjacent segment bodies 31 are subjected to convective cooling by the cooling air CA blown out through the rotationally upstream-side axial channel 45 and the rotationally upstream-side first lateral channels 46 and through the rotationally downstream-side lateral channels 53. The segment body 31 is subjected to film cooling by the cooling air CA flowing along the inner surfaces 32a, 32e, and thus the segment body 31 is efficiently cooled. In a conventional cooling structure of the upstream-side lateral end 35, therefore, the rotationally upstream-side first lateral channels 46 are not provided, and the lateral end 35 is subjected to convective cooling through the rotationally upstream-side axial channel 45 and the cooling air CA is discharged from the downstream-side end 47 into the combustion gas FG. In this embodiment, by contrast, a part of the lateral end 35 from an intermediate position to the downstream side is subjected to direct cooling (purge cooling) through the rotationally upstream-side first lateral channels 46 after an upstream-side part of the lateral end 35 is subjected to convective cooling through the rotationally upstream-side axial channel 45. Thus, the lateral end 35 is efficiently cooled and the amount of cooling air required is reduced.

Thus, the ring segment of the first embodiment includes the main body 32 forming the main cooling space 37 that is provided on the outer side of the segment body 31 in the radial direction Dr of the ring segment 27 and receives the cooling air CA from the outside, and the axial channels (first cooling channels) 44 provided inside the segment body 31 so as to extend along the axial direction Da of the rotor 14 and be arrayed in the circumferential direction Dc. First ends of the axial channels 44 communicate with the main cooling space 37 on the upstream side thereof in the flow direction of the combustion gas FG, while second ends thereof open toward the downstream side of the segment body 31 in the flow direction of the combustion gas FG. Moreover, the rotationally upstream-side axial channel 45 is disposed inside the segment body 31 on the upstream side in the rotation direction R of the rotor 14, adjacent to the axial channel 44. The rotationally upstream-side axial channel 45 extends along the axial direction Da of the rotor 14, and a first end of the rotationally upstream-side axial channel 45 communicates with the main cooling space 37 on the upstream side thereof in the flow direction of the combustion gas FG. Furthermore, the rotationally upstream-side first lateral channels 46 are provided that branch off from the predetermined region X1 of the rotationally upstream-side axial channel 45 stretching from the end of the segment body 31 on the downstream side in the flow direction of the combustion gas FG toward the upstream side in the axial direction Da, and that extend along the circumferential direction Dc of the ring segment 27. First ends of the rotationally upstream-side first lateral channels 46 communicate with the rotationally upstream-side axial channel 45, while second ends thereof open toward the upstream side in the rotation direction R of the rotor 14, to the clearance 62a between the segment body 31 and another segment body 31 adjacent thereto in the rotation direction R.

Thus, the cooling air CA supplied from outside to the main cooling space 37 flows through the axial channels 44 along the axial direction Da of the segment body 31 and is blown out toward the downstream side in the flow direction of the combustion gas FG, thereby performing convective cooling on the segment body 31. Moreover, the cooling air CA in the main cooling space 37 flows through the rotationally upstream-side axial channel 45 along the axial direction Da of the segment body 31, and is then divided into the rotationally upstream-side first lateral channels 46 and blown out toward the upstream side in the rotation direction R of the rotor 14. A region of the segment body 31 on the upstream side in the rotation direction R of the rotor 14 and on the downstream side in the flow direction of the combustion gas FG is thereby subjected to convective cooling and direct cooling (purge cooling). As a result, a region of the segment body 31 that tends to reach a high temperature is intensively cooled. Thus, the ring segment 27 can be cooled at an appropriate position through effective reuse of the cooling air CA so as to avoid performance degradation.

In the ring segment of the first embodiment, the impingement plate 34 having the small holes 38 is fixed to the recess in the outer surface 32b of the segment body 31 to define the main cooling space 37. Thus, impingement cooling can be performed on the segment body 31 to efficiently cool the segment body 31.

In the ring segment of the first embodiment, a second end of the rotationally upstream-side axial channel (second cooling channel) 45 may be closed. Thus, the entire cooling air CA supplied to the rotationally upstream-side axial channel 45 can be supplied to the rotationally upstream-side first lateral channels 46 to efficiently perform convective cooling and direct cooling (purge cooling) on the downstream side of the segment body 31 in the flow direction of the combustion gas FG.

In the ring segment of the first embodiment, the second end of the rotationally upstream-side axial channel 45 may open toward the downstream side of the segment body 31 in the flow direction of the combustion gas FG, and may be provided with the constriction. Thus, most of the cooling air CA supplied to the rotationally upstream-side axial channel 45 can be supplied to the rotationally upstream-side first lateral channels 46 to efficiently perform convective cooling and direct cooling (purge cooling) on a part of the segment body 31 on the downstream side in the flow direction of the combustion gas FG.

In the ring segment of the first embodiment, the axial channels 44 are arrayed inside the segment body 31 along the circumferential direction Dc of the ring segment 27, and the density of openings of the axial channels 44b on the upstream side in the rotation direction R (in the second region Z2) is set to be higher than the density of openings of the axial channels 44a on the downstream side in the rotation direction R (in the first region Z1) adjacent to the axial channels 44b in the rotation direction R. Thus, the area of cooling of the lateral end 35 of the segment body 31 on the upstream side in the rotation direction R of the rotor 14 is increased and the heat-transfer coefficient is raised, so that a region that tends to reach a high temperature can be efficiently cooled.

In the ring segment of the first embodiment, the rotationally downstream-side lateral channels (fourth cooling channels) 53 are provided which extend inside the segment body 31 along the circumferential direction Dc of the ring segment 27, and of which first ends communicate with the main cooling space 37 through the downstream-side cooling space 51 and the downstream-side connection channels 52, while second ends open at the lateral end 36 on the downstream side in the rotation direction R of the rotor 14. Thus, part of the cooling air CA supplied to the main cooling space 37 can be blown out through the rotationally downstream-side lateral channels 53 toward the downstream side in the rotation direction R of the rotor 14, so that the lateral end 36 of the segment body 31 on the downstream side in the flow direction of the combustion gas FG can be efficiently cooled by convective cooling.

In the ring segment of the first embodiment, the rotationally upstream-side first lateral channels 46 are provided in a region along a part of the overall length of the segment body 31 in the flow direction of the combustion gas FG from the end of the segment body 31 on the upstream side to the end thereof on the downstream side in the flow direction of the combustion gas FG, that is a region stretching from an intermediate position of 50% to 25% of the overall length from the downstream-side end surface 47a toward the upstream side, to the end on the downstream side in the flow direction of the combustion gas FG. Thus, the rotationally upstream-side first lateral channels 46 are provided in an appropriate region of the segment body 31 on the downstream side in the flow direction of the combustion gas FG, so that a region of the segment body 31 on the upstream side in the rotation direction R of the rotor 14 and on the downstream side in the flow direction of the combustion gas FG can be efficiently cooled.

The gas turbine of the first embodiment includes the compressor 11 that compresses the air A, the combustor 12 that mixes the compressed air CA compressed by the compressor 11 with the fuel FL and combusts the mixture, the turbine 13 that obtains rotary power by the combustion gas FG generated by the combustor 12, and the ring segment 27 that is disposed on the outer circumferential side of the blades 25 in the turbine 13.

Thus, it is possible to cool the ring segment 27 at an appropriate position through effective reuse of the cooling air CA by intensively cooling a region of the segment body 31 that tends to reach a high temperature. As a result, the amount of compressed air AC required can be reduced and degradation of the turbine performance can be avoided.

Modified Example of First Embodiment

Figure 9A:
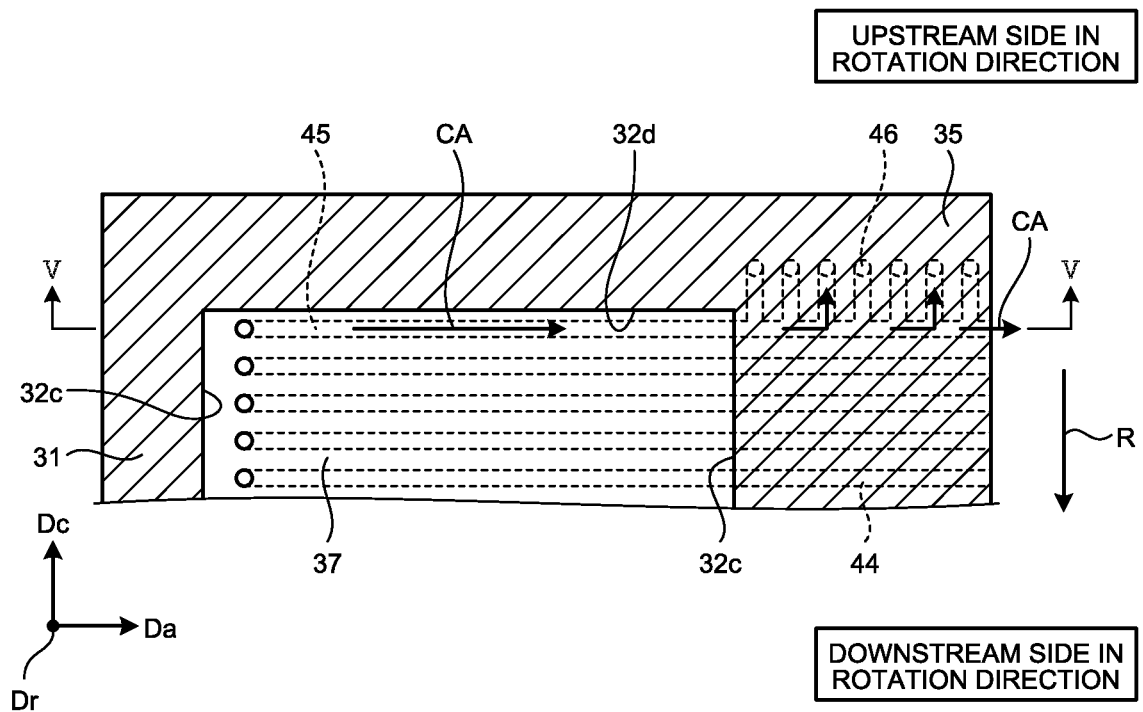
FIG. 9A is a partial sectional view as seen from the outer side in the radial direction, showing a modified example of rotationally upstream-side first lateral channels of a first embodiment.

Next, a modified example of the first embodiment of the above-described ring segment including the rotationally upstream-side first lateral channels will be described using FIG. 9A and FIG. 9B. FIG. 9A is a partial sectional view, as seen from the outer side in the radial direction Dr, of a ring segment including rotationally upstream-side first lateral channels according to this modified example, and FIG. 9B is a sectional view of the ring segment of this modified example as seen from the circumferential direction Dc.

As shown in FIG. 2, the segment body 31 is supported on the casing 29 through the heat shield ring 28, and the hooks (support members) 33 that are disposed respectively on the upstream side and the downstream side in the axial direction Da. Moreover, as shown in FIG. 9A, all the rotationally upstream-side first lateral channels 46 branching off from the rotationally upstream-side axial channel 45 toward the upstream side in the rotation direction R of the rotor 14 are formed farther on the axially downstream side than the inner wall 32c, extending in the circumferential direction Dc, of the hook 33 disposed on the downstream side in the axial direction Da. On the other hand, as described above, the main cooling space 37 is formed by the outer surface 32b of the main body 32, the inner wall surfaces 32c of the hooks 33, and the inner wall surfaces 32d of the lateral ends 35, 36. Therefore, when all the rotationally upstream-side first lateral channels 46 are formed farther on the downstream side in the axial direction Da than the inner wall surface 32c, extending in the circumferential direction Dc, of the hook 33 disposed on the downstream side in the axial direction Da, this means that the rotationally upstream-side first lateral channels 46 are not formed in a flat region defining the main cooling space 37 but formed farther on the downstream side in the axial direction Da than this flat region. The structure of the segment body is otherwise the same as in the first embodiment.

Figure 9B:
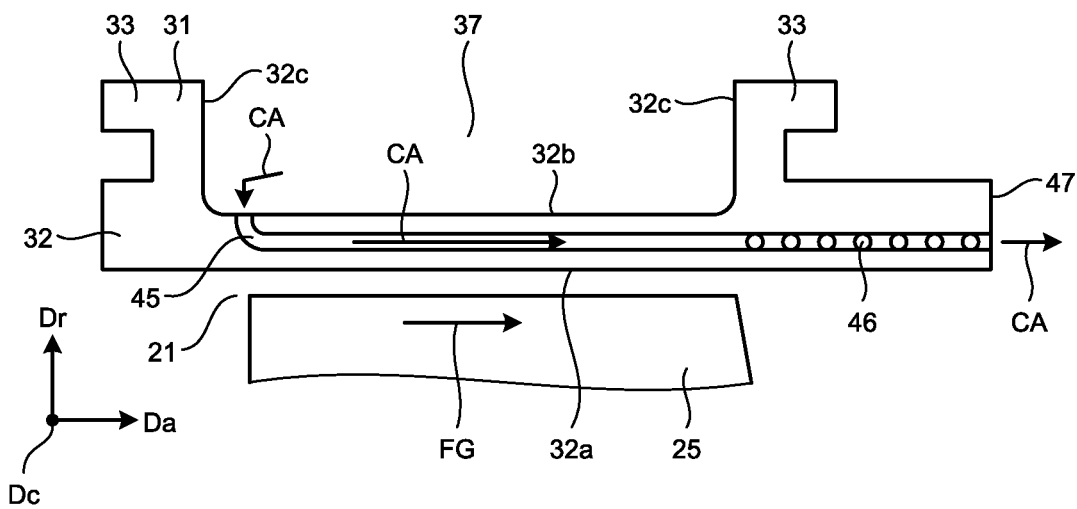
FIG. 9B is a sectional view, as seen from the circumferential direction, of the modified example of the rotationally upstream-side first lateral channels (section V-V in FIG. 9-1).

When cooling of the lateral end 35 of the segment body 31 on the upstream side in the rotation direction R of the rotor 14 relies only on convective cooling through the rotationally upstream-side axial channel 45 as shown in FIG. 9A and FIG. 9B, the lateral end 35 is overheated because of the above-described combination of a heat input from the high-temperature combustion gas FG entrapped in the clearance 62a between the segment bodies 31 and a decrease in the cooling capacity of the cooling air CA due to heating up. In particular, a region in which the hook 33 on the downstream side in the axial direction Da is disposed and which stretches from the inner wall surface 32c of this hook 33 to the end 47 on the downstream side in the axial direction Da, or a region that stretches from the position of the inner wall surface 32c of the hook 33 on the downstream side in the axial direction Da toward the downstream side in the axial direction Da in the lateral end 35 forming the end of the main body 32 on the upstream side in the rotation direction R, does not directly face the flat region of the main cooling space 37, and thus tends to be not sufficiently cooled. Therefore, forming the rotationally upstream-side first lateral channels 46 farther on the downstream side in the axial direction Da than the inner wall surface 32c in the region where the hook 33 on the downstream side in the axial direction Da is disposed, can further prevent thermal damage to the downstream-side region of the lateral end 35 of the segment body 31 that tends to be not sufficiently cooled. Moreover, forming the rotationally upstream-side first lateral channels 46 farther on the downstream side in the axial direction Da than the flat region of the main cooling space 37 is also effective in preventing thermal damage to the downstream-side part of the lateral end 35.

In the first embodiment, the region X1 where the rotationally upstream-side first lateral channels 46 are formed has been descried as a region that stretches, from an intermediate position of 50% to 25% of the overall length of the segment body 31 in the flow direction of the combustion gas FG as seen from the downstream side of the segment body 31 in the flow direction of the combustion gas FG, to the end surface 47a of the end 47 on the downstream side in the flow direction of the combustion gas FG. When an intermediate position of the region X1 corresponds to a percentage smaller than 25% as seen in the direction from the downstream-side end surface 47a toward the upstream side in the flow direction of the combustion gas FG, the rotationally upstream-side first lateral channels 46 lie outside the region X1 of the first embodiment but are included in the range in which the rotationally upstream-side first lateral channels 46 are formed as shown in this modified example, so that the lateral end 35 is unlikely to be damaged due to insufficient cooling.

Second Embodiment

Figure 10:
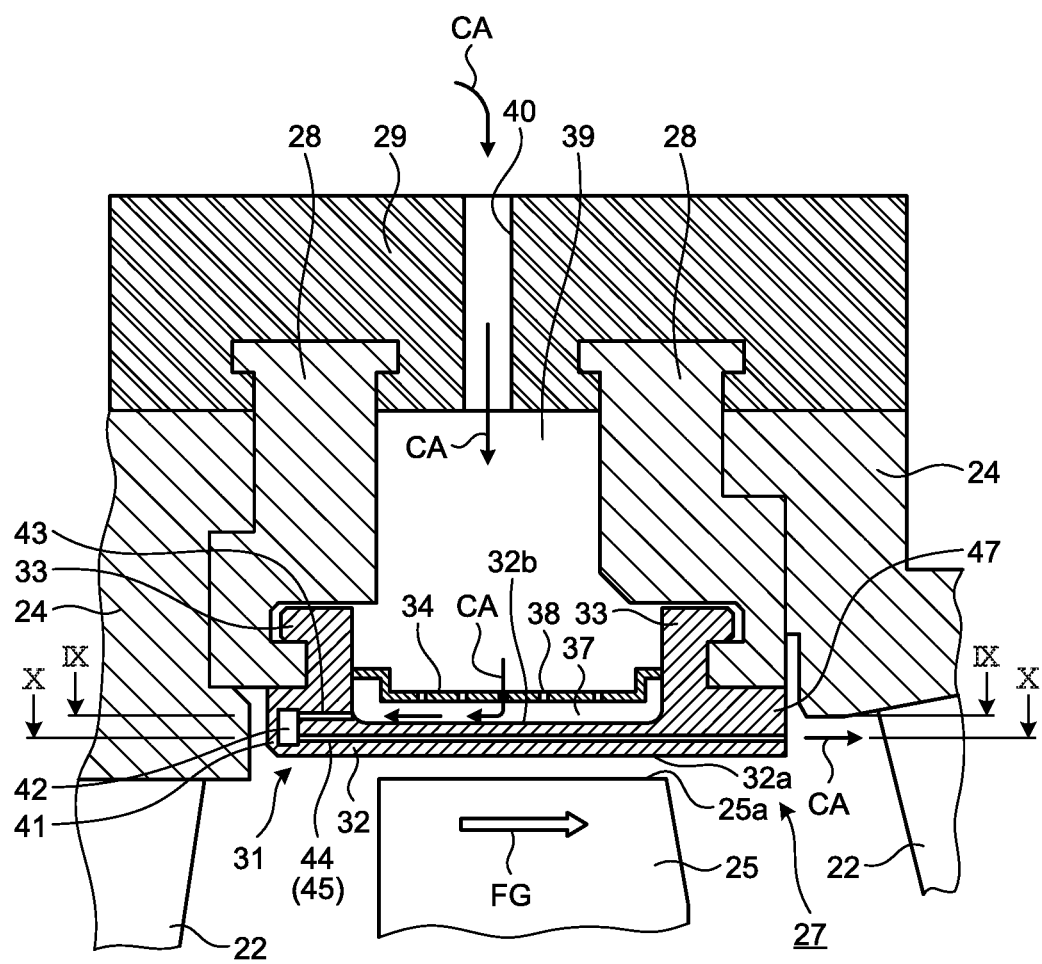
FIG. 10 is a sectional view showing how a ring segment, a heat shield ring, and a casing are coupled together in a gas turbine of a second embodiment.
Figure 11:
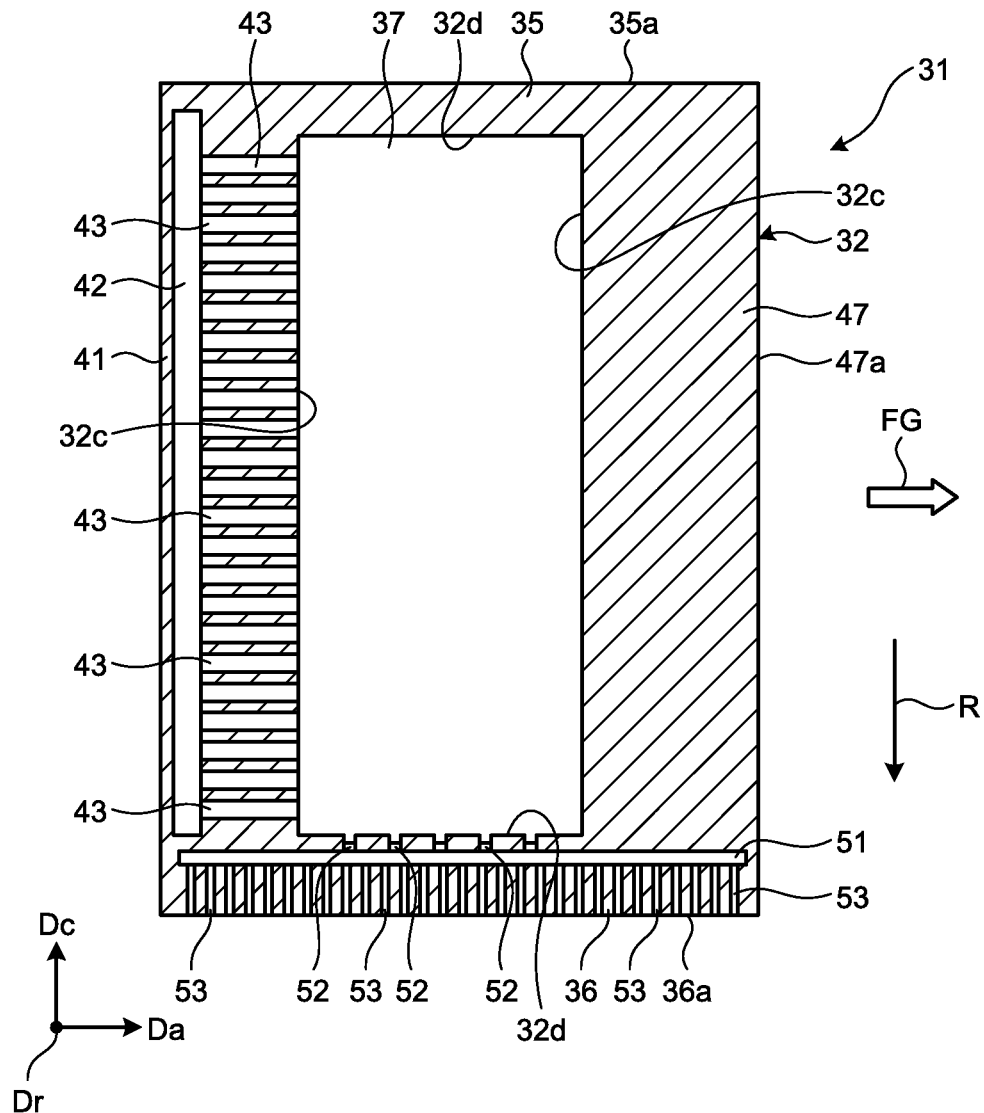
FIG. 11 is a sectional view of the ring segment as seen from the outer side in the radial direction (section IX-IX in FIG. 10).
Figure 12:
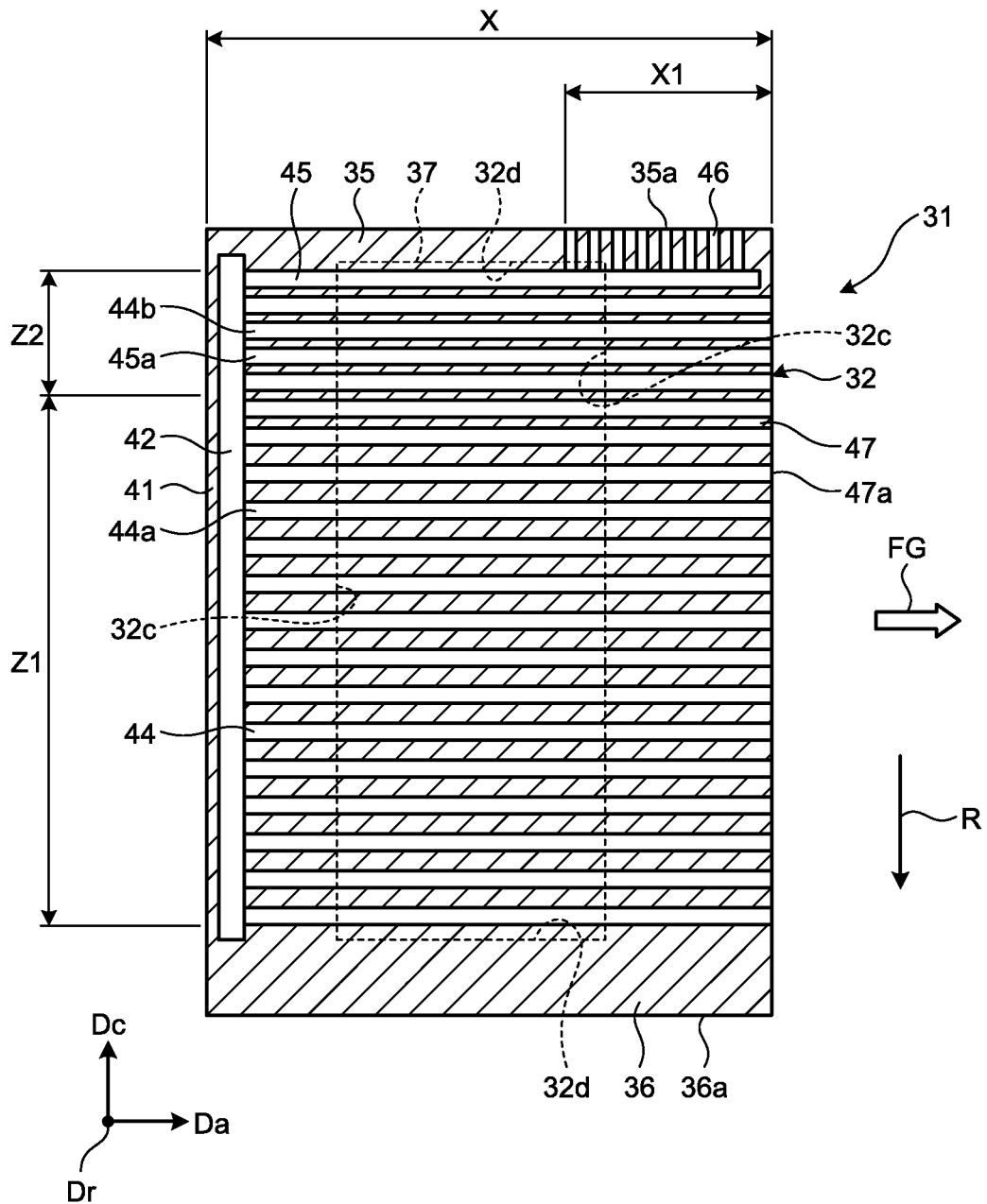
FIG. 12 is a view of a section of the ring segment near a surface on the inner side in the radial direction (section X-X in FIG. 10).

FIG. 10 is a sectional view showing how a ring segment, a heat shield ring, and a casing are coupled together in a gas turbine of a second embodiment. FIG. 11 is a sectional view of the ring segment as seen from the outer side in the radial direction (section IX-IX in FIG. 10). FIG. 12 is a view of a section of the ring segment near a surface on the inner side in the radial direction (section X-X in FIG. 10). Those members that have the same functions as in the above embodiment will be denoted by the same reference signs and a detailed description thereof will be omitted.

In the second embodiment, as shown in FIG. 10 to FIG. 12, the ring segment 27 is composed of the segment bodies 31 that are arranged annularly along the circumferential direction Dc (the rotation direction R of the rotor 14).

The segment body 31 has the main body 32 and the hooks (support members) 33 as main components. The segment body 31 is provided with the main cooling space 37 that is surrounded by the main body 32, the hooks 33, and the lateral ends 35, 36 that are provided respectively on the upstream side and the downstream side in the rotation direction R of the rotor 14. The main cooling space 37 may include the impingement plate 34, and the space on the outer side of the ring segment 27 in the radial direction Dr of the rotor 14 may be partitioned by the impingement plate 34. The impingement plate 34 is provided with the small holes 38 through which the cooling air CA passes.

An upstream-side cooling space (upstream-side cavity) 42 that extends along the circumferential direction Dc of the ring segment 27 (the rotation direction R of the rotor 14) is provided at an upstream-side end 41 of the segment body 31 on the upstream side in the flow direction of the combustion gas FG. The main cooling space 37 and the upstream-side cooling space 42 communicate with each other through a plurality of upstream-side channels 43 provided along the axial direction Da of the rotor 14. Moreover, the segment body 31 is provided with the axial channels (first cooling channels) 44 that extend along the flow direction of the combustion gas FG and are arrayed in the circumferential direction Dc of the ring segment 27. Furthermore, the segment body 31 is provided with the rotationally upstream-side axial channel (second cooling channel) 45 that extends along the flow direction of the combustion gas FG and is arrayed in the circumferential direction Dc of the ring segment 27. The upstream-side channels 43 are provided farther on the outer side in the radial direction Dr than the axial channels 44 and the rotationally upstream-side axial channel 45 and communicate with one another through the upstream-side cooling space 42.

The axial channels 44 are provided inside the segment body 31 so as to be arrayed in the circumferential direction Dc, and the rotationally upstream-side axial channel 45 is provided on the most upstream side in the segment body 31 in the rotation direction R of the rotor 14, adjacent to the axial channel 44 in the circumferential direction Dc. Here, the axial channels 44 are formed by channels that are different from each other in density of openings in the circumferential direction Dc. Specifically, the axial channels 44 are formed by the axial channels 44a that are provided in the first region Z1 located on the downstream side of the segment body 31 in the rotation direction R of the rotor 14, and the axial channels 44b that are provided in the adjacent second region Z2 located on the upstream side of the axial channels 44a in the rotation direction R of the rotor 14. The second region Z2 is a region located adjacent to and on the downstream side of the rotationally upstream-side axial channel 45 in the rotation direction R and defined between the axial channel 44a and the rotationally upstream-side axial channel 45. The significance of the density of openings is the same as in the first embodiment.

The ends of the axial channels 44 on the upstream side in the flow direction of the combustion gas FG communicate with the upstream-side cooling space 42, while the ends thereof on the downstream side in the flow direction of the combustion gas FG open in the end surface 47a of the downstream-side end 47. The end of the rotationally upstream-side axial channel 45 on the upstream side in the flow direction of the combustion gas FG communicates with the upstream-side cooling space 42, while the end of the rotationally upstream-side axial channel 45 on the downstream side in the flow direction of the combustion gas FG opens in the end surface 47a of the downstream-side end 47. The end of the rotationally upstream-side axial channel 45 on the downstream side in the flow direction of the combustion gas FG may be closed.

The segment body 31 is further provided with the rotationally upstream-side first lateral channels 46 at the lateral end 35 on the upstream side in the rotation direction R of the rotor 14. The ends of the rotationally upstream-side first lateral channels 46 on the downstream side in the rotation direction R of the rotor 14 communicate with the rotationally upstream-side axial channel 45, while the ends thereof on the upstream side in the rotation direction R of the rotor 14 open in the end surface 35a of the lateral end 35. The rotationally upstream-side first lateral channels 46 are provided in the predetermined region X1 stretching along a part of the overall length of the segment body 31 from the end thereof on the downstream side in the flow direction of the combustion gas FG toward the upstream side. The concept of the predetermined region X1 can be applied to this embodiment as well as to the first embodiment.

The segment body 31 is provided with the downstream-side cooling space 51 at the lateral end 36 on the downstream side in the rotation direction R of the rotor 14, and the main cooling space 37 and the downstream-side cooling space 51 communicate with each other through the downstream-side connection channels 52. The segment body 31 is further provided with the rotationally downstream-side lateral channels 53 at the lateral end 36 on the downstream side in the rotation direction R of the rotor 14, and the ends of the rotationally downstream-side lateral channels 53 on the upstream side in the rotation direction R of the rotor 14 communicate with the downstream-side cooling space 51, while the ends thereof on the downstream side in the rotation direction R of the rotor 14 open in the end surface 36a of the lateral end 36. The concept of the modified example of the first embodiment is also applicable to this embodiment.

Here, a method of cooling the ring segment 27 and a method of supplying the cooling air CA in the second embodiment will be described.

The cooling air CA from the casing 29 is supplied to each segment body 31 of the ring segment 27 through the supply hole 40. The cooling air CA is blown out to the main cooling space 37 through the small holes 38 formed in the impingement plate 34 disposed inside the segment body 31, and thereby performs impingement cooling on the outer surface 32b of the main body 32 of the segment body 31. The cooling air CA having performed impingement cooling performs convective cooling on an upper part of the upstream-side end 41 of the segment body 31 while being supplied through the upstream-side channels 43 to the upstream-side cooling space 42. The cooling air CA having been supplied to the upstream-side cooling space 42 performs convective cooling on the main body 32 while flowing through the axial channels 44 and the rotationally upstream-side axial channel 45 and being discharged from the end surface 47a of the downstream-side end 47 into the combustion gas FG. Since the density of openings of the axial channels 44b of the axial channels 44 that are disposed in the second region Z2 is set to be higher than that of the axial channels 44a disposed in the first region Z1, the segment body 31 has a higher cooling capacity in a region on the upstream side in the rotation direction R of the rotor 14 than in a region on the downstream side.

The cooling air CA having been supplied from the main cooling space 37 to the downstream-side cooling space 51 through the downstream-side connection channels 52 is supplied to the rotationally downstream-side lateral channels 53, and is discharged from the end surface 36a of the lateral end 36 into the combustion gas FG in the clearance 62a between the segment body 31 and the adjacent segment body 31. In this case, the cooling air CA is discharged to the clearance 62a between the segment bodies 31, and thereby performs convective cooling on the downstream-side lateral end 36 as well as cools an atmospheric gas by purging the combustion gas FG from the clearance 62a. As the cooling air CA is discharged through the rotationally downstream-side lateral channels 53 that are provided so as to be inclined downward in the radial direction Dr, the cooling air CA is blown against the end surface 35a of the upstream-side lateral end 35 of the adjacent segment body 31 and flows along the inner surfaces 32a, 32e, and thereby performs film cooling on the end surface 35a and the inner surfaces 32a, 32e.

On the other hand, the cooling air CA having been supplied to the upstream-side cooling space 42 flows through the rotationally upstream-side axial channel 45 and is supplied from the rotationally upstream-side axial channel 45 to the rotationally upstream-side first lateral channels 46, and is discharged from the end surface 35a of the lateral end 35 into the combustion gas FG. In this case, the cooling air CA is discharged to the clearance 62a between the segment bodies 31, and thereby performs convective cooling on a region of the upstream-side lateral end 35 on the downstream side in the flow direction of the combustion gas FG. As the cooling air CA is discharged through the rotationally upstream-side first lateral channels 46 that are provided so as to be inclined downward (toward the inner side) in the radial direction Dr, the cooling air CA turns around along the end surface 35a of the lateral end 35 and flows along the inner surfaces 32e, 32a toward the downstream side in the rotation direction R of the rotor 14, and thereby performs film cooling on the end surface 35a and the inner surfaces 32a, 32e.

The cooling air CA that cools the segment body 31 in this embodiment is supplied from the main cooling space 37 to the rotationally upstream-side axial channel 45 through the upstream-side channels 43 and the upstream-side cooling space 42. Thus, the cooling air CA flowing through the rotationally upstream-side axial channel 45 in this embodiment is overheated through the main body 32 in the upstream-side channels 43 and the upstream-side cooling space 42, and is further overheated in the rotationally upstream-side axial channel 45, so that this cooling air CA is heated up more than the cooling air CA flowing through the rotationally upstream-side axial channel 45 in the first embodiment. Accordingly, the lateral end 36 and the lateral end 35 respectively on the downstream side and the upstream side in the rotation direction R of the rotor 14 tend to be heated to higher temperatures than in the first embodiment. For this reason, the entire region along the flow direction of the combustion gas FG of the lateral end 36 on the downstream side in the rotation direction R of the rotor 14 is cooled by the cooling air CA from the rotationally downstream-side lateral channels 53, and the lateral end 36 itself is subjected to convective cooling. On the other hand, the lateral end 35 on the upstream side in the rotation direction R of the rotor 14 is subjected to convective cooling as well as direct cooling (purge cooling), mainly at a region on the downstream side in the flow direction of the combustion gas FG, by the cooling air CA from the rotationally upstream-side first lateral channels 46. Specifically, a region on the upstream side in the flow direction of the combustion gas FG in the lateral end 35 on the upstream side in the rotation direction R of the rotor 14 is subjected to convective cooling by the cooling air CA flowing through the rotationally upstream-side axial channel 45. Moreover, a part of the lateral end 35 on the downstream side in the flow direction of the combustion gas FG is subjected to direct cooling (purge cooling) through the rotationally upstream-side first lateral channels 46. Thus, as the cooling capacity for the lateral end 35, the combination of the rotationally upstream-side axial channel 45 and the rotationally upstream-side first lateral channels 46 can provide sufficient cooling.

Thus, in the ring segment of the second embodiment, the segment body 31 is provided with the upstream-side cooling space 42 farther on the upstream side in the flow direction of the combustion gas FG than the main cooling space 37, and the main cooling space 37 and the upstream-side cooling space 42 communicate with each other through the upstream-side channels 43, and the axial channels 44 and the rotationally upstream-side axial channel 45 communicate with the upstream-side cooling space 42. Moreover, the rotationally upstream-side first lateral channels 46 branch off from the rotationally upstream-side axial channel 45, and the cooling air CA is discharged from the end surface 35a of the lateral end 35 on the upstream side in the rotation direction R to the clearance 62a. The cooling air CA in the main cooling space 37 is supplied through the upstream-side channels 43 to the upstream-side cooling space 42, and is supplied from the upstream-side cooling space 42 to the axial channels 44 and the rotationally upstream-side axial channel 45. Thus, the cooling air CA flows through the rotationally upstream-side first lateral channels 46 and performs convective cooling and direct cooling (purge cooling) on a part of the lateral end 35 on the downstream side in the flow direction of the combustion gas FG, so that a region of the segment body 31 on the upstream side in the rotation direction R of the rotor 14 and on the downstream side in the flow direction of the combustion gas FG can be efficiently cooled.

Third Embodiment

Figure 13:
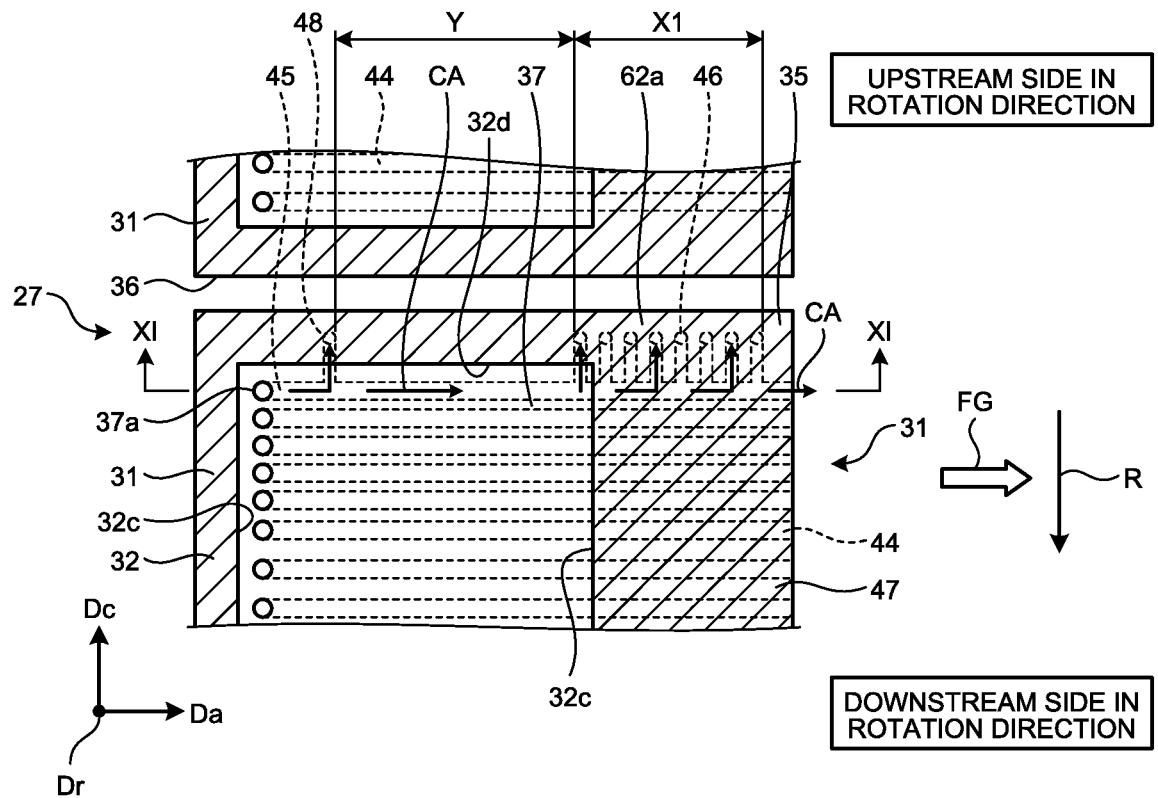
FIG. 13 is a partial sectional view, as seen from the outer side in the radial direction, of rotationally upstream-side second lateral channels according to a third embodiment.
Figure 14:
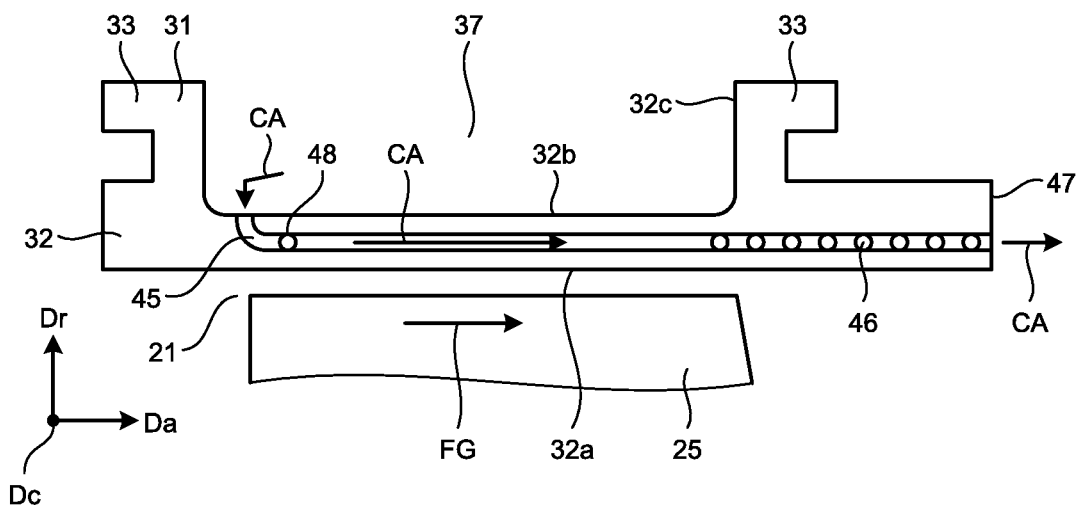
FIG. 14 is a sectional view of the ring segment as seen from the circumferential direction (section XI-XI in FIG. 13).

FIG. 13 is a partial sectional view of a ring segment of a gas turbine of a third embodiment as seen from the outer side in the radial direction Dr, and FIG. 14 is a sectional view of the ring segment as seen from the circumferential direction Dc. A ring segment cooling structure of the third embodiment represents an aspect in which a rotationally upstream-side second lateral channel (fifth cooling channel) is added to the ring segment cooling structure of the first embodiment as a lateral channel provided at the lateral end 35 on the rotationally upstream side. The cooling structure will be described in detail later. Those members that have the same functions as in the above embodiments will be denoted by the same reference signs and a detailed description thereof will be omitted.

Even in the above embodiments, the lateral end on the rotationally upstream side may be overheated depending on the service conditions of the gas turbine. This embodiment is an embodiment aimed at further enhancing cooling of the ring segment as supplementary means for adapting to the service conditions of the gas turbine. Specifically, as shown in FIG. 13, this embodiment, like the first embodiment, includes the rotationally upstream-side axial channel 45 having the opening 37a in the outer surface 32b of the segment body 31 that is the bottom surface of the main cooling space 37, and the rotationally upstream-side first lateral channels 46 (third cooling channels) that branch off from the rotationally upstream-side axial channel 45. Moreover, as the cooling structure of the lateral end 35 on the upstream side in the rotation direction R of the rotor 14, this embodiment includes a rotationally upstream-side second lateral channel 48 on the upstream side in the flow direction of the combustion gas FG, in addition to the rotationally upstream-side first lateral channels 46.

An end of the rotationally upstream-side second lateral channel 48 on the downstream side in the rotation direction R of the rotor 14 communicates with the rotationally upstream-side axial channel 45, while an end thereof on the upstream side in the rotation direction R of the rotor 14 opens in the end surface 35a of the lateral end 35. The rotationally upstream-side second lateral channel 48 may be formed by a single (one) channel or a plurality of channels. Moreover, a plurality of channel groups each composed of a plurality of channels may be disposed along the combustion gas flow direction, and a collection of these channel groups may constitute the rotationally upstream-side second lateral channel 48.

It is desirable that the rotationally upstream-side second lateral channel 48 be located in the axial direction Da between a most upstream-side position that is near the position of the opening 37a of the rotationally upstream-side axial channel 45 and a most downstream-side position that is on the upstream side in the axial direction Da of, and a predetermined distance Y away from, an upstream end of the region X1 where the rotationally upstream-side first lateral channels 46 are disposed. From the viewpoint of preventing overheating due to the combustion gas, it is desirable that the predetermined distance Y be at least larger than the array pitch of the individual channels of the rotationally upstream-side first lateral channels 46 and correspond to 50% or more of the axial width of the main cooling space 37. Disposing the rotationally upstream-side second lateral channel 48 has not only an effect of subjecting the lateral end 35 to convective cooling but also an effect of diluting the combustion gas FG and thereby preventing overheating of the lateral end 35.

The rotationally upstream-side second lateral channel 48 is provided for the purposes of subjecting the lateral end 35 to convective cooling and diluting the combustion gas FG, and it is not necessary to dispose as many channels as the rotationally upstream-side first lateral channels 46. Specifically, as described above, the rotationally upstream-side second lateral channel 48 is formed by a single channel, or a plurality of channels, or channel groups that are a collection of a plurality of channel configurations each composed of a plurality of channels, and the channel groups are provided at intervals larger than the array pitch of the channels. In other words, except for the case of a single (one) channel, the density of openings of the rotationally upstream-side second lateral channels 48 is set to be lower than the density of openings of the rotationally upstream-side first lateral channels 46. The significance of the density of openings is the same as in the first embodiment.

The combustion gas FG having a higher-than-normal temperature may flow around the ring segment 27 depending on the service conditions of the gas turbine. Based on the assumption of such cases, in this embodiment, the rotationally upstream-side second lateral channel 48 is provided on the upstream side in the flow direction of the combustion gas FG in addition to the rotationally upstream-side first lateral channels 46, to discharge part of the cooling air CA into the combustion gas. Discharging the cooling air CA through the rotationally upstream-side second lateral channel 48 to the clearance 62a between the adjacent segment bodies 31 has not only the effect of subjecting the lateral end 35 to convective cooling but also the effect of diluting the combustion gas FG entrapped in the clearance 62a with the cooling air CA and thereby lowering the temperature of the combustion gas. Thus lowering the temperature of the combustion gas FG by discharging part of the cooling air CA into the combustion gas FG on the upstream side of the segment body 31 in the axial direction Da is effective as supplementary means for the ring segment cooling structure shown in the first embodiment, since thereby a heat input from the inner surface 32e of the lateral end 35 on the downstream side in the flow direction of the combustion gas FG is suppressed and overheating of a downstream-side region of the lateral end 35 on the upstream side in the rotation direction R is prevented.

In addition to the aspect shown in this embodiment, the aspects shown in the first embodiment, the second embodiment, and the modified example of the first embodiment described above can also be applied to the ring segment of this embodiment and thereby achieve similar workings and effects.

According to the ring segment cooling structure of this embodiment, the cooling air CA discharged through the rotationally upstream-side second lateral channel 48 disposed on the upstream side in the flow direction of the combustion gas FG performs convective cooling on the lateral end 35 as well as dilutes the combustion gas FG entrapped in the clearance 62a of the ring segment 27 and thereby lowers the temperature of the combustion gas. Thus, overheating of a region on the downstream side in the flow direction of the combustion gas FG in the lateral end 35 on the upstream side in the rotation direction R can be prevented.

Modified Example of Third Embodiment

Figure 15:
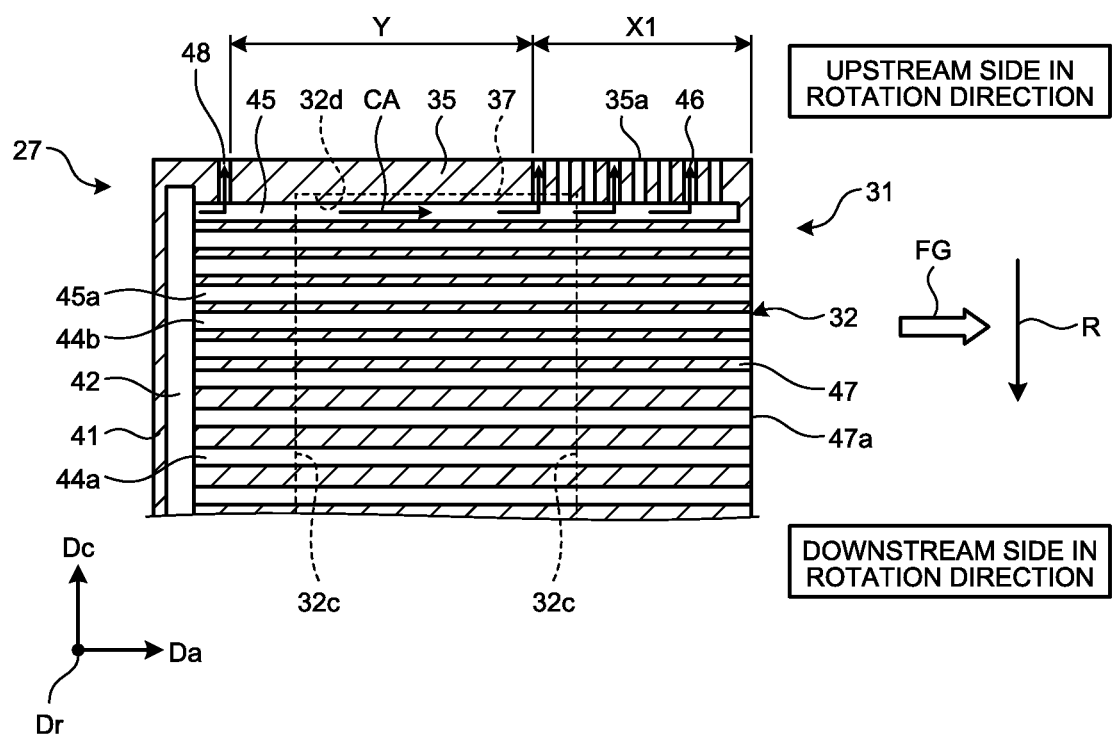
FIG. 15 is a partial sectional view of the ring segment as seen from the outer side in the radial direction, showing a modified example of the rotationally upstream-side second lateral channels according to the third embodiment.

FIG. 15 shows a modified example of the rotationally upstream-side second lateral channel of the ring segment in the gas turbine of the third embodiment, and is a partially sectional view of the ring segment as seen from the outer side in the radial direction Dr. A ring segment cooling structure shown in this modified example represents an aspect in which the rotationally upstream-side second lateral channel 48 (fifth cooling channels) is added to the ring segment cooling structure of the second embodiment as a lateral channel provided at the lateral end 35 on the rotationally upstream side. Those members that have the same functions as in the above embodiments will be denoted by the same reference signs and a detailed description thereof will be omitted.

The basic concept of this modified example is the same as that of the third embodiment. That is, depending on the service conditions of the gas turbine, the lateral end on the rotationally upstream side may be overheated even in the ring segment shown in the above-described second embodiment, and therefore this modified example is aimed at further enhancing cooling of the ring segment as supplementary means for adapting to the service conditions of the gas turbine. Specifically, as shown in FIG. 15, the cooling structure of the ring segment 27 in this modified example is, like that of the second embodiment, formed by the rotationally upstream-side axial channel 45 that branches off from the upstream-side cooling space 42 provided at the end 41 of the segment body 31 on the upstream side in the axial direction Da, and the rotationally upstream-side first lateral channels 46 that branch off from the rotationally upstream-side axial channel 45 and are disposed on the downstream side in the flow direction of the combustion gas FG of the lateral end 35 formed on the upstream side in the rotation direction R. Moreover, the cooling structure of this modified example includes the rotationally upstream-side second lateral channel 48 that is disposed on the upstream side of the rotationally upstream-side first lateral channels 46 in the combustion gas flow direction and branches off from the rotationally upstream-side axial channel 45. Thus, in this modified example, the upstream-side end of the rotationally upstream-side axial channel 45 is connected to the upstream-side cooling space 42 disposed at the upstream-side end 41, and the position of the upstream-side end of the rotationally upstream-side axial channel 45 is accordingly located farther on the upstream side in the axial direction Da than the position shown in the third embodiment (opening 37a).

Also in this modified example, in addition to the aspect shown in this modified example, the aspects shown in the first embodiment, the second embodiment, and the modified example of the first embodiment described above can also be applied to the ring segment of this embodiment and thereby achieve similar workings and effects.

According to the ring segment cooling structure in this modified example, as in the third embodiment, the cooling air CA discharged through the rotationally upstream-side second lateral channel 48 disposed on the upstream side in the flow direction of the combustion gas FG performs convective cooling on the lateral end 35 as well as dilutes the combustion gas FG entrapped in the clearance 62a of the ring segment and thereby lowers the temperature of the combustion gas. Thus, overheating of a region on the downstream side in the flow direction of the combustion gas FG in the lateral end 35 on the upstream side in the rotation direction R can be prevented.

REFERENCE SIGNS LIST

10 Gas turbine
11 Compressor
12 Combustor
13 Turbine
14 Rotor
15 Power generator
21 Combustion gas flow passage
22 Vane
25 Blade
27 ring segment
28 Heat shield ring
29 Casing
31 Segment body
32 Main body
32c, 32d Inner wall surface
33 Hook (support member)
34 Impingement plate (porous plate)
35, 36 Lateral end
37 Main cooling space (main cavity)
38 Small hole
39 Reception space
40 Supply hole
41 Upstream-side end
42 Upstream-side cooling space (upstream-side cavity)
43 Upstream-side channel
44 Axial channel (first cooling channel)
45 Rotationally upstream-side axial channel (second cooling channel)
46 Rotationally upstream-side first lateral channel (third cooling channel)
47 Downstream-side end
48 Rotationally upstream-side second lateral channel (fifth cooling channel)
51 Downstream-side cooling space (downstream-side cavity)
52 Downstream-side connection channel
53 Rotationally downstream-side lateral channel (fourth cooling channel)

61 Sealing member
A Air
AC Compressed air
CA Cooling air
FL Fuel
FG Combustion gas

The invention claimed is:

1. A ring segment of a gas turbine, the ring segment being formed as a plurality of segment bodies is arranged annularly along a circumferential direction and comprising:
   a main cavity that is provided on an outer side of the segment body in a radial direction of the ring segment and receives cooling air from outside;
   a plurality of first cooling channels which is provided inside the segment body so as to extend along an axial direction of a rotor and be arrayed in the circumferential direction, and of which first ends communicate directly with the main cavity on an upstream side thereof in a combustion gas flow direction while second ends open toward a downstream side of the segment body in the combustion gas flow direction;
   a second cooling channel which is disposed inside the segment body on an upstream side thereof in a rotation direction of the rotor, adjacent to a cooling channel of the plurality of first cooling channels, so as to extend along the axial direction of the rotor, the second cooling channel having a first end which communicates with an opening formed on an end of the main cavity on the upstream side thereof in the combustion gas flow direction, the second cooling channel extending from a position of the opening toward the downstream side in the combustion gas flow direction, and reaching a second end of the second cooling channel at a downstream-side end of the segment body in the combustion gas flow direction; and
   a plurality of third cooling channels which is provided inside the segment body so as to extend along the circumferential direction of the ring segment, in a predetermined region along the axial direction of the rotor that is a region forming a part of a lateral end of the segment body on the upstream side in the rotation direction of the rotor and stretching only from an intermediate position of an overall length of the segment body in the combustion gas flow direction to the downstream-side end of the segment body in the combustion gas flow direction, the plurality of third cooling channels having first ends which communicate with the second cooling channel and second ends which open at the lateral end on the upstream side in the rotation direction of the rotor,
   wherein the intermediate position is arranged farther toward the downstream side in the combustion gas flow direction than the opening formed on the end of the main cavity on the upstream side thereof.

2. The ring segment according to claim 1, wherein the main cavity is defined as an impingement plate fixed to a recess on an outer surface side of the segment body.

3. The ring segment according to claim 1, wherein the segment body is provided with an upstream-side cavity farther on the upstream side in the combustion gas flow direction than the main cavity,
   wherein the main cavity and the upstream-side cavity communicate with each other through an upstream-side channel,
   and wherein the first cooling channels of the plurality of first cooling channels and the second cooling channel communicate with the upstream-side cavity.

4. The ring segment according to claim 1, wherein a second end of the second cooling channel is closed.

5. The ring segment according to claim 1, wherein a second end of the second cooling channel opens toward the downstream side of the segment body in the combustion gas flow direction and is provided with a constriction.

6. The ring segment according to claim 1, wherein the first cooling channels of the plurality of first cooling channels are arrayed inside the segment body along the circumferential direction of the ring segment, and a density of openings of those of the first cooling channels of the plurality of first cooling channels that are provided on the upstream side in the rotation direction of the rotor is set to be higher than a density of openings of those of the first cooling channels of the plurality of first cooling channels that are provided on the downstream side in the rotation direction of the rotor.

7. The ring segment according to claim 1, further comprising a plurality of fourth cooling channels which is provided inside the segment body so as to extend along the circumferential direction of the ring segment, and of which first ends communicate with the main cavity while second ends open toward the downstream side in the rotation direction of the rotor.

8. The ring segment according to claim 1, wherein the third cooling channels of the plurality of third cooling channels are provided from the end of the segment body on the downstream side in the combustion gas flow direction toward the upstream side, in a region stretching from a position of 50% to 25% of an overall length of the segment body in the combustion gas flow direction to the end on the downstream side in the combustion gas flow direction.

9. The ring segment according to claim 1, wherein the third cooling channels of the plurality of third cooling channels are disposed farther on the downstream side in the combustion gas flow direction than a region where the main cavity is formed.

10. The ring segment according to claim 1, wherein the segment body includes a plurality of support members that extends from ends of a main body on the upstream side and the downstream side in the axial direction toward the outer side in the radial direction and supports the segment body onto a casing, and the third cooling channels of the plurality of third cooling channels are disposed farther on the downstream side in the combustion gas flow direction than an inner wall surface of the support member that is disposed on the downstream side in the axial direction.

11. The ring segment according to claim 1, further comprising a fifth cooling channel which is disposed at the lateral end on the upstream side in the rotation direction of the rotor, on the upstream side of the third cooling channels of the plurality of third cooling channels in the combustion gas flow direction, and of which a first end communicates with the second cooling channel while a second end opens at the lateral end on the upstream side in the rotation direction of the rotor.

12. The ring segment according to claim 11, wherein the fifth cooling channel is one of a plurality of fifth cooling channels, and wherein a density of openings of the plurality of fifth cooling channels is set to be lower than a density of openings of the third cooling channels of the plurality of third cooling channels.

13. A gas turbine comprising:
   a compressor that compresses air;
   a combustor that mixes compressed air compressed by the compressor with fuel and combusts the mixture;
   a turbine that obtains rotary power by combustion gas generated by the combustor; and the ring segment according to claim 1 that is disposed on an outer circumferential side of blades in the turbine.

14. A ring segment of a gas turbine, the ring segment being formed as a plurality of segment bodies is arranged annularly along a circumferential direction and comprising:
- a main cavity that is provided on an outer side of the segment body in a radial direction of the ring segment and receives cooling air from outside;
- a plurality of first cooling channels which is provided inside the segment body so as to extend along an axial direction of a rotor and be arrayed in the circumferential direction, and of which first ends communicate directly with the main cavity on an upstream side thereof in a combustion gas flow direction while second ends open toward a downstream side of the segment body in the combustion gas flow direction;
- a second cooling channel which is disposed inside the segment body on an upstream side thereof in a rotation direction of the rotor, adjacent to a cooling channel of the plurality of first cooling channels, so as to extend along the axial direction of the rotor, the second cooling channel having a first end which communicates with an opening formed on an end of the main cavity on the upstream side thereof in the combustion gas flow direction, the second cooling channel extending from a position of the opening toward the downstream side in the combustion gas flow direction, and reaching a second end of the second cooling channel at a downstream-side end of the segment body in the combustion gas flow direction;
- a plurality of third cooling channels which is provided inside the segment body so as to extend along the circumferential direction of the ring segment, in a predetermined region along the axial direction of the rotor that is a region forming a part of a lateral end of the segment body on the upstream side in the rotation direction of the rotor and stretching only from an intermediate position of an overall length of the segment body in the combustion gas flow direction to the downstream-side end of the segment body in the combustion gas flow direction, the plurality of third cooling channels having first ends which communicate with the second cooling channel and second ends which open at the lateral end on the upstream side in the rotation direction of the rotor; and
- a plurality of fourth cooling channels which, with respect to the combustion gas flow direction, is disposed between the intermediate position and the position of the opening which communicates with the first end of the second cooling channel,
- wherein a density of openings of the fourth cooling channels of the plurality of fourth cooling channels is smaller than a density of openings of the third cooling channels of the plurality of third cooling channels.

* * * * *